(12) United States Patent
Batarseh

(10) Patent No.: US 11,739,616 B1
(45) Date of Patent: Aug. 29, 2023

(54) FORMING PERFORATION TUNNELS IN A SUBTERRANEAN FORMATION

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/830,608

(22) Filed: Jun. 2, 2022

(51) Int. Cl.
  *E21B 43/11* (2006.01)
  *E21B 7/15* (2006.01)
  *E21B 47/135* (2012.01)
  *E21B 7/14* (2006.01)

(52) U.S. Cl.
  CPC .......... *E21B 43/11* (2013.01); *E21B 7/14* (2013.01); *E21B 7/15* (2013.01); *E21B 47/135* (2020.05)

(58) Field of Classification Search
  CPC .......... E21B 43/11; E21B 7/15; E21B 47/135; E21B 7/14; E21B 29/02
  See application file for complete search history.

(56) References Cited

U.S. PATENT DOCUMENTS

| | | |
|---|---|---|
| 1,819,055 A | 8/1931 | Jan et al. |
| 1,990,969 A | 2/1935 | Russell |
| 2,094,479 A | 9/1937 | Vandergrift |
| 2,288,556 A | 6/1942 | Vollmer |
| 2,757,738 A | 9/1948 | Ritchey |
| 2,466,674 A | 4/1949 | Mullady |
| 2,606,813 A | 8/1952 | Kurt |
| 2,699,213 A | 1/1955 | Cardwell et al. |
| 2,795,279 A | 6/1957 | Erich |
| 2,799,641 A | 7/1957 | Gordon |
| 2,885,004 A | 5/1959 | Perry |

(Continued)

FOREIGN PATENT DOCUMENTS

| | | |
|---|---|---|
| CA | 2669721 | 7/2011 |
| CN | 101079591 | 11/2007 |

(Continued)

OTHER PUBLICATIONS

Al-Nakhli et al., "Chemically-induced pressure pulse to increase stimulated reservoir vol. in unconventional reservoirs." SPE/AAPG/SEG Unconventional Resources Technology Conference. OnePetro, Aug. 2014, 19 pages.

(Continued)

*Primary Examiner* — Yong-Suk (Philip) Ro
(74) *Attorney, Agent, or Firm* — Fish & Richardson P.C.

(57) ABSTRACT

A downhole tool includes a housing configured to couple to a downhole conveyance; a laser tool positioned in the housing and configured to transmit a laser beam sufficient to form a tunnel in a subterranean formation; a chamber positioned in the housing and configured to enclose a shaped members that include at least two laser reflective surfaces; and a perforating head coupled to the housing. The perforating head includes an optical pathway formed to receive the laser beam from the laser tool and output the laser beam toward the subterranean formation through an outlet of the perforating head; and at least one conduit separate from the optical pathway and configured to receive the shaped members from the chamber and output the shaped members through the outlet of the perforating head.

22 Claims, 9 Drawing Sheets

(56) References Cited

U.S. PATENT DOCUMENTS

| | | |
|---|---|---|
| 3,016,244 A | 1/1962 | Friedrich et al. |
| 3,025,911 A | 3/1962 | Bergman |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,354,954 A | 11/1967 | Buxton |
| 3,385,360 A | 5/1968 | Smith |
| 3,405,761 A | 10/1968 | Parker |
| 3,428,125 A | 2/1969 | Parker |
| 3,476,183 A | 11/1969 | Haynes, Jr. et al. |
| 3,483,923 A | 12/1969 | Darley |
| 3,522,848 A | 8/1970 | New |
| 3,543,856 A | 12/1970 | Knox et al. |
| 3,547,192 A | 12/1970 | Claridge et al. |
| 3,547,193 A | 12/1970 | Gill |
| 3,568,772 A | 3/1971 | Gogarty et al. |
| 3,576,596 A | 4/1971 | Kranc et al. |
| 3,642,066 A | 2/1972 | Gill |
| 3,696,866 A | 10/1972 | Dryden |
| 3,707,192 A | 12/1972 | Goins, Jr. et al. |
| 3,712,380 A | 1/1973 | Caffey |
| 3,719,228 A | 3/1973 | Carcia |
| 3,760,881 A | 9/1973 | Kiel |
| 3,828,854 A | 8/1974 | Templeton et al. |
| 3,862,662 A | 1/1975 | Kern |
| 3,864,451 A | 2/1975 | Lee et al. |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,056,146 A | 11/1977 | Hall |
| 4,084,637 A | 4/1978 | Todd |
| 4,085,799 A | 4/1978 | Bousaid et al. |
| 4,135,579 A | 1/1979 | Rowland et al. |
| 4,136,739 A | 1/1979 | Salathiel et al. |
| 4,140,179 A | 2/1979 | Kasevich et al. |
| 4,140,180 A | 2/1979 | Bridges et al. |
| 4,144,935 A | 3/1979 | Bridges et al. |
| 4,158,042 A | 6/1979 | Deutschman |
| 4,178,993 A | 12/1979 | Richardson et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,210,628 A | 7/1980 | Ninomiya et al. |
| 4,219,083 A | 8/1980 | Richardson et al. |
| 4,232,740 A | 11/1980 | Park |
| 4,232,741 A | 11/1980 | Richardson et al. |
| 4,265,307 A | 5/1981 | Elkins |
| RE30,738 E | 9/1981 | Bridges et al. |
| 4,291,765 A | 9/1981 | Gilchrist et al. |
| 4,301,865 A | 11/1981 | Kasevich et al. |
| 4,320,801 A | 3/1982 | Rowland et al. |
| 4,330,037 A | 5/1982 | Richardson et al. |
| 4,373,581 A | 2/1983 | Toellner |
| 4,396,062 A | 8/1983 | Iskander |
| 4,399,868 A | 8/1983 | Richardson et al. |
| 4,410,041 A | 10/1983 | Davies et al. |
| 4,412,585 A | 11/1983 | Bouck |
| 4,414,118 A | 11/1983 | Murphey |
| 4,449,585 A | 5/1984 | Bridges et al. |
| 4,454,918 A | 6/1984 | Richardson et al. |
| 4,457,365 A | 7/1984 | Kasevich et al. |
| 4,470,459 A | 9/1984 | Copland |
| 4,475,595 A | 10/1984 | Watkins et al. |
| 4,476,926 A | 10/1984 | Bridges et al. |
| 4,482,016 A | 11/1984 | Richardson et al. |
| 4,484,627 A | 11/1984 | Perkins |
| 4,485,007 A | 11/1984 | Tam et al. |
| 4,485,868 A | 12/1984 | Sresty et al. |
| 4,485,869 A | 12/1984 | Sresty et al. |
| 4,487,257 A | 12/1984 | Dauphine |
| 4,491,180 A | 1/1985 | Brown et al. |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,518,040 A | 5/1985 | Middleton |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,572,297 A | 2/1986 | Thigpen, Jr. et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,615,391 A | 10/1986 | Garthoffner |
| 4,620,593 A | 11/1986 | Haagensen |
| 4,660,636 A | 4/1987 | Rundell et al. |
| 4,703,803 A | 11/1987 | Blumer |
| 4,705,108 A | 11/1987 | Little et al. |
| 4,817,711 A | 4/1989 | Jearnbey |
| 4,832,123 A | 5/1989 | Abou-Sayed et al. |
| 4,842,073 A | 6/1989 | Himes et al. |
| 4,846,277 A | 7/1989 | Khalil et al. |
| 4,865,826 A | 9/1989 | Carnell et al. |
| 4,898,750 A | 2/1990 | Friedman et al. |
| 4,919,209 A | 4/1990 | King |
| 4,981,036 A | 1/1991 | Curry et al. |
| 5,055,180 A | 10/1991 | Klaila |
| 5,068,819 A | 11/1991 | Misra et al. |
| 5,082,054 A | 1/1992 | Kiamanesh |
| 5,082,058 A | 1/1992 | Blumer |
| 5,087,350 A | 2/1992 | Paris-Marcano |
| 5,152,906 A | 10/1992 | Aften et al. |
| 5,183,581 A | 2/1993 | Khalil et al. |
| 5,197,544 A | 3/1993 | Himes et al. |
| 5,209,295 A | 5/1993 | Campos et al. |
| 5,236,039 A | 8/1993 | Edelstein et al. |
| 5,342,530 A | 8/1994 | Aften et al. |
| 5,358,565 A | 10/1994 | Shu et al. |
| 5,375,660 A | 12/1994 | Wehunt |
| 5,411,093 A | 5/1995 | Jennings, Jr. |
| 5,411,094 A | 5/1995 | Northrop |
| 5,639,313 A | 6/1997 | Khalil |
| 5,899,274 A | 5/1999 | Frauenfeld et al. |
| 5,958,224 A | 9/1999 | Ho et al. |
| 6,035,933 A | 3/2000 | Khalil et al. |
| 6,041,860 A | 3/2000 | Nazzal et al. |
| 6,116,342 A | 9/2000 | Clark et al. |
| 6,189,611 B1 | 2/2001 | Kasevich |
| 6,277,271 B1 | 8/2001 | Kocal |
| 6,413,399 B1 | 7/2002 | Kasevich |
| 6,500,219 B1 | 12/2002 | Gunnerman |
| 6,518,543 B1 | 2/2003 | Benz et al. |
| 6,544,411 B2 | 4/2003 | Varandaraj |
| 6,554,071 B1 | 4/2003 | Reddy et al. |
| 6,662,874 B2 | 12/2003 | Surjaatmadja et al. |
| 6,678,616 B1 | 1/2004 | Winkler et al. |
| 6,722,434 B2 | 4/2004 | Reddy et al. |
| 6,755,262 B2 | 6/2004 | Parker |
| 6,814,141 B2 | 11/2004 | Huh et al. |
| 6,817,415 B2 | 11/2004 | Orban et al. |
| 6,827,845 B2 | 12/2004 | Gong et al. |
| 6,881,325 B2 | 4/2005 | Morris et al. |
| 6,888,097 B2 | 5/2005 | Batarseh |
| 6,986,392 B2 | 1/2006 | Chatteiji et al. |
| 6,992,048 B2 | 1/2006 | Reddy et al. |
| 7,029,639 B2 | 4/2006 | Yasutake et al. |
| 7,048,051 B2 | 5/2006 | McQueen |
| 7,059,414 B2 | 6/2006 | Rae et al. |
| 7,066,260 B2 | 6/2006 | Sullivan et al. |
| 7,091,460 B2 | 8/2006 | Kinzer |
| 7,109,457 B2 | 9/2006 | Kinzer |

(56) References Cited

U.S. PATENT DOCUMENTS

| | | |
|---|---|---|
| 7,115,847 B2 | 10/2006 | Kinzer |
| 7,131,498 B2 | 11/2006 | Campo et al. |
| 7,147,064 B2 * | 12/2006 | Batarseh ............... E21B 7/15 |
| | | 175/11 |
| 7,153,434 B1 | 12/2006 | Dennis |
| 7,210,528 B1 | 5/2007 | Brannon et al. |
| 7,312,428 B2 | 12/2007 | Kinzer |
| 7,328,746 B2 | 2/2008 | Al-Taq et al. |
| 7,331,385 B2 | 2/2008 | Symington |
| 7,445,041 B2 | 11/2008 | O'Brien |
| 7,461,693 B2 | 12/2008 | Considine et al. |
| 7,484,561 B2 | 2/2009 | Bridges |
| 7,490,664 B2 | 2/2009 | Skinner et al. |
| 7,540,328 B2 | 6/2009 | Brown et al. |
| 7,562,708 B2 | 7/2009 | Cogliandro et al. |
| 7,589,050 B2 | 9/2009 | Frenier et al. |
| 7,624,743 B2 | 12/2009 | Sarkar et al. |
| 7,629,497 B2 | 12/2009 | Pringle |
| 7,631,691 B2 | 12/2009 | Symington et al. |
| 7,677,673 B2 | 3/2010 | Tranquilla et al. |
| 7,686,084 B2 | 3/2010 | Reddy et al. |
| 7,754,659 B2 | 7/2010 | Rediger et al. |
| 7,779,915 B2 | 8/2010 | Hutchins et al. |
| 7,828,057 B2 | 11/2010 | Kearl et al. |
| 7,909,096 B2 | 3/2011 | Clark et al. |
| 7,947,629 B2 | 5/2011 | Fuller |
| 8,091,637 B2 | 1/2012 | Fripp |
| 8,096,349 B2 | 1/2012 | Considine et al. |
| 8,096,361 B2 | 1/2012 | Willberg |
| 8,109,336 B2 | 2/2012 | Wheeler et al. |
| 8,168,570 B2 | 5/2012 | Barron et al. |
| 8,210,256 B2 | 7/2012 | Bridges et al. |
| 8,216,344 B2 | 7/2012 | Degenstein et al. |
| 8,282,715 B1 | 10/2012 | Degenstein et al. |
| 8,356,667 B2 | 1/2013 | Quintero et al. |
| 8,526,171 B2 | 9/2013 | Wu et al. |
| 8,627,901 B1 | 1/2014 | Underwood et al. |
| 8,678,087 B2 | 3/2014 | Schultz et al. |
| 8,755,262 B2 | 6/2014 | Ueki |
| 8,824,240 B2 | 9/2014 | Roberts et al. |
| 8,826,973 B2 | 9/2014 | Moxley et al. |
| 8,869,888 B2 | 10/2014 | Cramer et al. |
| 8,960,215 B2 | 2/2015 | Cui et al. |
| 8,962,536 B2 | 2/2015 | Winslow et al. |
| 9,040,154 B2 | 5/2015 | Rogin et al. |
| 9,134,456 B2 | 9/2015 | Eick et al. |
| 9,170,250 B2 | 10/2015 | Lehmann et al. |
| 9,217,291 B2 | 12/2015 | Batarseh |
| 9,353,612 B2 | 5/2016 | Batarseh |
| 9,403,115 B2 | 8/2016 | Majumder et al. |
| 9,488,042 B2 | 11/2016 | Al-Nakhli et al. |
| 9,567,819 B2 | 2/2017 | Cavender et al. |
| 9,599,750 B2 | 3/2017 | Thompson et al. |
| 9,670,764 B2 | 6/2017 | Lesko et al. |
| 9,701,894 B2 | 7/2017 | Al-Nakhli et al. |
| 9,765,609 B2 | 9/2017 | Chemali et al. |
| 9,803,135 B2 | 10/2017 | Barron et al. |
| 9,840,902 B2 | 12/2017 | Nguyen |
| 9,932,803 B2 | 4/2018 | Batarseh et al. |
| 9,932,809 B2 | 4/2018 | Dashevsky et al. |
| 10,195,687 B2 * | 2/2019 | Land ..................... E21C 37/16 |
| 10,199,798 B2 | 2/2019 | Faircloth et al. |
| 10,330,915 B2 | 6/2019 | Rudolf et al. |
| 10,422,209 B2 | 9/2019 | Batarseh |
| 10,641,079 B2 | 5/2020 | Aljubran et al. |
| 10,655,401 B2 * | 5/2020 | Azar ..................... E21B 10/62 |
| 10,941,644 B2 | 3/2021 | Aljubran et al. |
| 10,968,736 B2 | 4/2021 | Batarseh |
| 11,163,091 B2 * | 11/2021 | Alabbad ............... G01V 9/007 |
| 11,187,068 B2 | 11/2021 | Batarseh |
| 11,619,097 B2 * | 4/2023 | Batarseh ............... E21B 7/15 |
| | | 175/16 |
| 2003/0075339 A1 | 4/2003 | Gano |
| 2003/0092581 A1 | 5/2003 | Crews |
| 2003/0221831 A1 | 12/2003 | Reddy et al. |
| 2004/0020693 A1 | 2/2004 | Damhof et al. |
| 2004/0256103 A1 | 12/2004 | Batarseh |
| 2005/0000694 A1 | 1/2005 | Dalrymple et al. |
| 2005/0199386 A1 | 9/2005 | Kinzer |
| 2005/0215439 A1 | 9/2005 | Blair |
| 2006/0076347 A1 | 4/2006 | Kinzer |
| 2006/0102343 A1 | 5/2006 | Skinner et al. |
| 2006/0102625 A1 | 5/2006 | Kinzer |
| 2006/0106541 A1 | 5/2006 | Hassan et al. |
| 2006/0144591 A1 | 7/2006 | Gonzalez et al. |
| 2006/0154814 A1 | 7/2006 | Zanibelli et al. |
| 2006/0229212 A1 | 10/2006 | Willberg et al. |
| 2006/0231257 A1 | 10/2006 | Reed et al. |
| 2006/0237233 A1 | 10/2006 | Reed et al. |
| 2006/0258541 A1 | 11/2006 | Crews |
| 2007/0000662 A1 | 1/2007 | Symington et al. |
| 2007/0108202 A1 | 5/2007 | Kinzer |
| 2007/0131591 A1 | 6/2007 | Pringle |
| 2007/0137852 A1 | 6/2007 | Considine et al. |
| 2007/0137858 A1 | 6/2007 | Considine et al. |
| 2007/0153626 A1 | 7/2007 | Hayes et al. |
| 2007/0181301 A1 | 8/2007 | O'Brien |
| 2007/0187089 A1 | 8/2007 | Bridges |
| 2007/0193744 A1 | 8/2007 | Bridges |
| 2007/0204994 A1 | 9/2007 | Wimmersperg |
| 2007/0261844 A1 | 11/2007 | Cogliandro et al. |
| 2007/0289736 A1 | 12/2007 | Kearl et al. |
| 2008/0066784 A1 | 3/2008 | Sarkar et al. |
| 2008/0073079 A1 | 3/2008 | Tranquilla et al. |
| 2008/0121395 A1 | 5/2008 | Reddy et al. |
| 2008/0173443 A1 | 7/2008 | Symington et al. |
| 2008/0190607 A1 | 8/2008 | Minnich et al. |
| 2008/0190610 A1 | 8/2008 | Barmatov et al. |
| 2008/0283243 A1 | 11/2008 | Rediger et al. |
| 2008/0289828 A1 | 11/2008 | Hutchins et al. |
| 2008/0318812 A1 | 12/2008 | Kakadjian et al. |
| 2009/0098467 A1 | 4/2009 | Lowe et al. |
| 2009/0209825 A1 | 8/2009 | Efinger et al. |
| 2009/0259446 A1 | 10/2009 | Zhang et al. |
| 2009/0288820 A1 | 11/2009 | Barron et al. |
| 2010/0056399 A1 | 3/2010 | Berkland et al. |
| 2010/0078414 A1 | 4/2010 | Perry et al. |
| 2010/0170453 A1 | 7/2010 | Betzer-Zilevitch |
| 2010/0186955 A1 | 7/2010 | Saasen et al. |
| 2010/0288499 A1 | 11/2010 | Al-Dhafeeri et al. |
| 2010/0326659 A1 * | 12/2010 | Schultz ................. E21B 29/06 |
| | | 166/297 |
| 2011/0011576 A1 | 1/2011 | Cavender et al. |
| 2011/0030958 A1 | 2/2011 | Fedorov et al. |
| 2011/0203797 A1 | 8/2011 | Alexandrov et al. |
| 2011/0220360 A1 | 9/2011 | Lindvig et al. |
| 2011/0278270 A1 | 11/2011 | Braga et al. |
| 2012/0012319 A1 | 1/2012 | Dennis |
| 2012/0075615 A1 | 3/2012 | Niclass et al. |
| 2012/0169841 A1 | 6/2012 | Chemali et al. |
| 2012/0181020 A1 | 7/2012 | Barron et al. |
| 2012/0211225 A1 | 8/2012 | Kostrov et al. |
| 2013/0000906 A1 | 1/2013 | Schultz et al. |
| 2013/0008653 A1 | 1/2013 | Schultz et al. |
| 2013/0037268 A1 | 2/2013 | Kleefisch et al. |
| 2013/0123151 A1 | 5/2013 | Crews |
| 2013/0126164 A1 | 5/2013 | Sweatman et al. |
| 2013/0126169 A1 | 5/2013 | Al-Nakhli et al. |
| 2013/0126175 A1 | 5/2013 | Al-Mulhem et al. |
| 2013/0146292 A1 | 6/2013 | Litvinets et al. |
| 2013/0180720 A1 | 7/2013 | Al-Dahlan et al. |
| 2013/0191029 A1 | 7/2013 | Heck, Sr. |
| 2013/0213637 A1 | 8/2013 | Kearl |
| 2013/0255936 A1 | 10/2013 | Statoilydro et al. |
| 2014/0034144 A1 | 2/2014 | Cui et al. |
| 2014/0069644 A1 | 3/2014 | Reddy et al. |
| 2014/0090839 A1 | 4/2014 | Al-Nakhli et al. |
| 2014/0090846 A1 | 4/2014 | Deutch |
| 2014/0144632 A1 | 5/2014 | Zavolzhski et al. |
| 2014/0231147 A1 | 8/2014 | Bozso et al. |
| 2014/0278111 A1 | 9/2014 | Gerrie et al. |
| 2014/0305660 A1 | 10/2014 | Ash et al. |
| 2014/0360778 A1 | 12/2014 | Batarseh |
| 2015/0252668 A1 | 9/2015 | Dashevsky et al. |

(56) References Cited

U.S. PATENT DOCUMENTS

| | | |
|---|---|---|
| 2015/0300142 A1 | 10/2015 | Al-Nakhli et al. |
| 2016/0075932 A1 | 3/2016 | Silveira et al. |
| 2016/0130499 A1 | 5/2016 | Nguyen |
| 2016/0153240 A1 | 6/2016 | Braga et al. |
| 2016/0247316 A1 | 8/2016 | Whalley et al. |
| 2016/0320518 A1 | 11/2016 | Mangione |
| 2017/0081950 A1 | 3/2017 | Filatyev et al. |
| 2017/0158938 A1 | 6/2017 | Rodney |
| 2017/0191314 A1 | 7/2017 | Faircloth et al. |
| 2017/0205526 A1 | 7/2017 | Meyer |
| 2017/0234104 A1 | 8/2017 | James |
| 2017/0261643 A1 | 9/2017 | Thompson et al. |
| 2018/0010419 A1 | 1/2018 | Livescu et al. |
| 2018/0044575 A1 | 2/2018 | Litvinets et al. |
| 2018/0266226 A1 | 9/2018 | Batarseh et al. |
| 2018/0272467 A1* | 9/2018 | Montaron ............... B23K 26/38 |
| 2019/0032434 A1* | 1/2019 | Batarseh ............... E21B 43/119 |
| 2019/0040726 A1 | 2/2019 | Deutch et al. |
| 2019/0211659 A1 | 6/2019 | Batarseh |
| 2019/0257973 A1 | 8/2019 | AlBahrani et al. |
| 2019/0353032 A1* | 11/2019 | Batarseh ................. E21B 43/11 |
| 2020/0115962 A1* | 4/2020 | Batarseh .................. E21B 7/15 |
| 2021/0156243 A1 | 5/2021 | Aljubran et al. |
| 2021/0285294 A1* | 9/2021 | Batarseh ............... E21B 21/002 |
| 2022/0056775 A1* | 2/2022 | Al-Badran ............. E21B 43/11 |
| 2022/0372822 A1* | 11/2022 | Batarseh ............... E21B 47/002 |

FOREIGN PATENT DOCUMENTS

| | | |
|---|---|---|
| CN | 101323780 | 12/2008 |
| CN | 101839123 | 9/2010 |
| CN | 102493813 | 6/2012 |
| CN | 102597419 | 7/2012 |
| CN | 203081295 | 7/2013 |
| CN | 203334954 | 12/2013 |
| CN | 104295448 | 1/2015 |
| CN | 204627586 | 9/2015 |
| CN | 105392954 | 3/2016 |
| CN | 107462222 | 12/2017 |
| EP | 0654582 | 5/1995 |
| EP | 0909873 | 4/1999 |
| EP | 2317068 | 5/2011 |
| EP | 2737173 | 6/2014 |
| GB | 2420135 | 5/2006 |
| JP | 2001019984 | 1/2001 |
| RU | 2100583 | 12/1997 |
| RU | 2126084 | 2/1999 |
| SU | 1677260 | 9/1991 |
| WO | WO 0037777 | 6/2000 |
| WO | WO 2006131895 | 12/2006 |
| WO | WO 2008032067 | 3/2008 |
| WO | WO 2008146017 | 12/2008 |
| WO | WO 2009009370 | 1/2009 |
| WO | WO 2009020889 | 2/2009 |
| WO | WO 2009070561 | 6/2009 |
| WO | WO 2010046618 | 4/2010 |
| WO | WO 2010047612 | 4/2010 |
| WO | WO 2011038170 | 3/2011 |
| WO | WO 2011153339 | 12/2011 |
| WO | WO 2012012224 | 1/2012 |
| WO | WO 2012025150 | 3/2012 |
| WO | WO 2012031009 | 3/2012 |
| WO | WO 2012082402 | 6/2012 |
| WO | WO 2013078306 | 5/2013 |
| WO | WO 2015030805 | 3/2015 |
| WO | WO 2015095155 | 6/2015 |
| WO | WO 2015175853 | 11/2015 |
| WO | WO 2016032478 | 3/2016 |
| WO | WO 2016085451 | 6/2016 |
| WO | WO 2016090229 | 6/2016 |
| WO | WO 2016168719 | 10/2016 |
| WO | WO 2016182469 | 11/2016 |
| WO | WO 2017011078 | 1/2017 |
| WO | WO 2018101990 | 6/2018 |
| WO | WO 2018169991 | 9/2018 |
| WO | WO 2019220198 | 11/2019 |

OTHER PUBLICATIONS

Aminzadeh, "Pattern recognition and imaging processing," Geophysical Press Limited, 1987, 5 pages (With English Abstract).

Ashton et al., "In-Situ Heat System Stimulates ParaffinicCrude Producers in Gulf of Mexico," SPE 15660, SPE Production Engineering, May 1989, 157-160, 4 pages.

Caryotakis, "The klystron: A microwave source of surprising range and endurance." The American Physical Society, Division of Plasma Physics Conference in Pittsburg, PA, Nov. 1997, 14 pages.

Cheng Yun-Fu, "Preparation and Field Uses of Heat Generating Hydrofracturing Fluids" Oilfield Chemistry Research Institute of Drilling and Production, Dagang Oil Fields, Dagang Oilfield Group Co., Ltd., vol. 14, No. pp. 24-27, Mar. 25, 1997, 4 pages (With English Abstract).

Chica et al., "Catalytic Oxidative Desulfurization (ODS) of Diesel Fuel on a Continuous Fixed-Bed Reactor," Journal of Catalysis, vol. 242, Sep. 2006, 229-308, 10 pages.

Filippis et al., "Oxidative Desulfurization: Oxidation Reactivity of Sulfur Compounds in Different Organic Matrixes," Energy & Fuels, vol. 17, No. 6, Nov. 2003, 1452-1455, 4 pages.

Gemmeke and Ruiter, "3D ultrasound computer tomography for medical imagining," Nuclear Instruments and Methods in Physics Research A 580, Oct. 1, 2007, 9 pages.

Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.

Khalil et al., "Detection of Formation Damage Associated to Paraffin in Reservoirs of the Reconcavo Baiano, Brazil," SPE 37238, Int'! Symposium on Oilfield Chemistry held in Houston, TX, Feb. 18-21, Feb. 1997, 5 pages.

Kiryukhin et al., "Thermal-hydrodynamic modeling of laboratory tests on the interaction of NaNO3—NaOH fluids with sandstone rock at a deep radionuclide repository site." Journal of Volcanology and Seismology 1.6, Dec. 2007, 429-438, 20 pages.

MaMarques et al., "A new technique to solve gas hydrate problems in subsea Christmas trees." SPE Production & Facilities 19.04, Nov. 2004, 253-258, 6 pages.

Mochida et al., "Adsorption and Adsorbed Species of SO2 during its Oxidative Removal over Pitch-Based Activated Carbon Fibers," Energy & Fuels, vol. 13, No. 2, Mar. 1999, 369-373, 5 pages.

Mochida et al., "Kinetic Study of the Continuous Removal of SOx on Polyacrylonnitrile-BasedActivated Carbon Fibres" Fuel vol. 76, No. 6, May 1997, 533-536, 4 pages.

Mochida et al., "Removal of SOx and NOx over activated carbon fibers," Carbon, vol. 38, Jan. 2000, 227-239, 13 pages.

Otsuki et al., "Oxidative Desulfurization of Light Gas Oi and Vacuum Gas Oil by Oxidation and Solvent Extraction," Energy & Fuels, vol. 14, No. 6, Nov. 2000, 1232-1239, 8 pages.

Raymundo-Pinero et al., "Temperature Programmed Desorption Study on the Mechanism of SO2 oxidation by Activated Carbon and Activated Carbon Fibres," Carbon, vol. 39, Feb. 2001, 231-242, 12 pages.

Ruiter et al., "3D ultrasound computer tomography of the breast: A new era?" European Journal of Radiology 81S1, Sep. 2012, 2 pages.

Sampanthar et al., "A Novel Oxidative Desulfurization Process to Remove Refractory Sulfur Compounds From Diesel Fuel," Applied Catalysis B: Environmental 63, Mar. 2006, 85-93, 9 pages.

Sano et al., "Adsorptive Removal of Sulfur and Nitrogen Species from a Straight Run Gas Oil Over Activated Carbons for its Deep Hydrodesulfurization," Applied Catalysis B: Environmental 49, Jun. 2004, 219-225, 7 pages.

Sano et al., Selection and Further Activation of Activated Carbons for Removal of Nitrogen Species in Gas Oil as a Pretreatment for its Deep Hydrodesulfurization, Energy & Fuels, vol. 18, Mar. 20, 2004, 644-651, 8 pages.

(56) References Cited

OTHER PUBLICATIONS

Sano, "Two-step Adsorption Process for Deep Desulfurization of Diesel Oil," Fuel 84, May 2005, 903-910, 8 pages.

Satoru Murata, "A Novel Oxidative Desulfurization System for Diesel Fuels with Molecular Oxygen in the Presence of Cobalt Catalysts and Aldehydes," Energy & Fuels, vol. 18, No. 1, Jan. 2004, 116-121, 6 pages.

Shirahama et al., "Mechanistic Study on Adsorption and Reduction of NO2 Over Activated Carbon Fibers," Carbon, vol. 40, Jan. 2002, 2605-2611, 7 pages.

Te et al., "Oxidation Reactivities of Dibenzothiophenes in Polyoxometalate/H2O2 and Formic Acid/H2O2 Systems," Applied Catalysis A: General 219, Oct. 2001, 267-280, 14 pages.

Xiang et al., "Adsorption and Reduction of NO2 Over Activated Carbon at Low Temperature," Fuel Processing Technology 92, Jan. 2011, 139-146, 8 pages.

Xu et al., "Rock perforation by pulsed Nd: YAG laser." International Congress on Applications of Lasers & Electro-Optics. vol. 2004, No. 1, Laser Institute of America, Oct. 2004, 4 pages.

Yazu et al., "Immobolized Tungstophosphoric Acid-Catalyzed Oxidative Desulfurization of Diesel Oil with Hydrogen Peroxide," Journal of Japan Petroleum Institute, vol. 46, No. 6, May 2003, 379-382, 4 pages.

Yazu et al., "Oxidative Desulfurization of Diesel Oil with Hydrogen Peroxide in the Presence of Acid Catalyst in Diesel Oil/Acetic Acid Biphase System," Chemistry Letters, vol. 33, No. 10, Jul. 2004, 1306-1307, 2 pages.

Zhou et al., "Deep desulfurization of diesel fuels by selective adsorption with activated carbons." ACS National Meeting Book of Abstracts. vol. 228. No. 2. American Chemical Society, Oct. 2004, 1 page.

\* cited by examiner

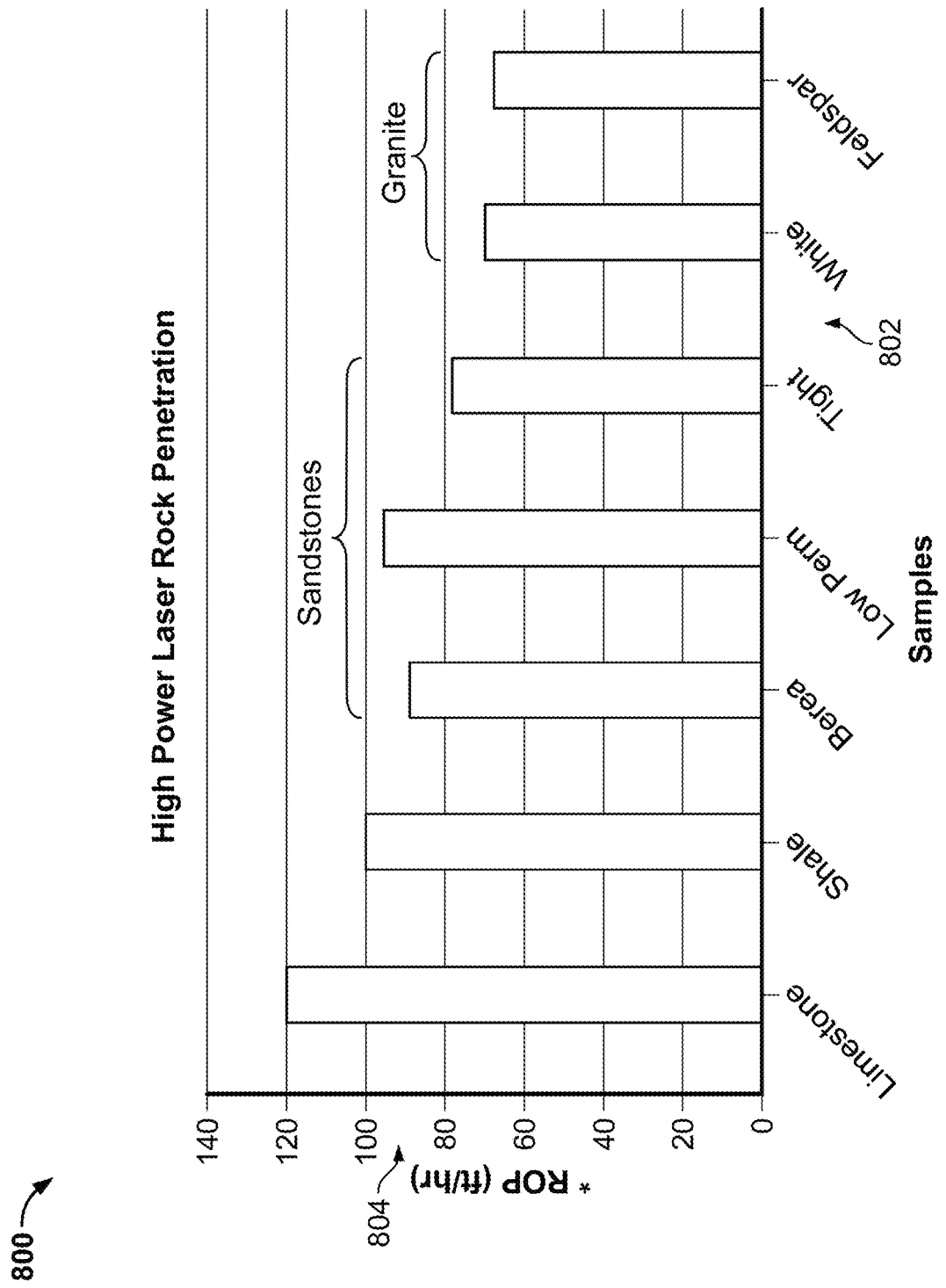

FORMING PERFORATION TUNNELS IN A SUBTERRANEAN FORMATION

TECHNICAL FIELD

The present disclosure describes apparatus, systems, and methods for forming perforation tunnels in a subterranean formation and, more particularly, forming perforation tunnels in a subterranean formation with a downhole laser.

BACKGROUND

Downhole laser tools are sometimes used as an alternative to conventional shaped charge perforation guns for generating perforation tunnels in a subterranean formation that holds hydrocarbon reserves. Downhole laser tools, as opposed to conventional perforating tools, can have greater precision, reliability, control, and cost. Downhole laser tools, in some instances, can penetrate all types of rock formations regardless of the hardness and stress orientation of the rock. Further, downhole laser tools have advantages including the ability to drill and penetrate in types of rock, drill different hole sizes, precise in orienting the laser beam to create a hole, and it is stress and structure independent.

SUMMARY

In an example implementation, a downhole tool includes a housing configured to couple to a downhole conveyance that is extendable from a terranean surface, through a wellbore, and to a subterranean formation; a laser tool positioned in the housing and configured to transmit a laser beam sufficient to form a tunnel in the subterranean formation; a chamber positioned in the housing and configured to enclose a plurality of shaped members, each of the plurality of shaped members including at least two laser reflective surfaces; and a perforating head coupled to the housing. The perforating head includes an optical pathway formed to receive the laser beam from the laser tool and output the laser beam toward the subterranean formation through an outlet of the perforating head; and at least one conduit separate from the optical pathway and configured to receive at least a portion of the plurality of shaped members from the chamber and output the portion of the plurality of shaped members through the outlet of the perforating head.

In an aspect combinable with the example implementation, the plurality of shaped members includes a plurality of polyhedrons, each of the plurality of polyhedrons including the at least two laser reflective surfaces.

In another aspect combinable with any of the previous aspects, the plurality of polyhedrons includes a first portion of first polyhedrons having a first number of laser reflective surfaces and a second portion of second polyhedrons having a second number of laser reflective surfaces different than the first number.

In another aspect combinable with any of the previous aspects, each of the plurality of polyhedrons includes a number of reflective surfaces equal to a number of faces of the polyhedron.

In another aspect combinable with any of the previous aspects, each of the reflective surfaces includes a unique angle of incidence and a unique angle of reflection relative to the other reflective surfaces.

In another aspect combinable with any of the previous aspects, at least one of the plurality of polyhedrons includes a tetrahedron, a cube, a decahedron, an octahedron, a dodecahedron, or an icosahedron.

In another aspect combinable with any of the previous aspects, each of the at least two laser reflective surfaces includes a mirrored or coated surface.

In another aspect combinable with any of the previous aspects, the laser tool is configured to couple to a laser generator through a fiber optic cable.

In another aspect combinable with any of the previous aspects, the laser generator is configured to generate the laser beam and transmit the generated laser beam to the laser tool through the fiber optic cable.

In another aspect combinable with any of the previous aspects, the perforating head further includes at least one focus lens positioned in the optical pathway and configured to shape the laser beam toward the outlet; and a cover lens positioned between the at least one focus lens and the outlet and configured to protect the at least one focus lens.

In another aspect combinable with any of the previous aspects, at least one of the plurality of shaped members is hollow.

In another example implementation, a method for laser perforating a subterranean formation includes running a downhole tool on a downhole conveyance into a wellbore formed from a terranean surface into a subterranean formation. The downhole tool includes a housing coupled to downhole conveyance, a laser tool positioned in the housing, a chamber positioned in the housing that encloses a plurality of shaped members, each of the plurality of shaped members including at least two laser reflective surfaces, and a perforating head coupled to the housing. The method further includes operating the laser tool to transmit a laser beam through an optical pathway formed in the perforating head and through an outlet of the perforating head to form a tunnel in the subterranean formation; subsequent to forming the tunnel in the subterranean formation with the laser beam, releasing at least a portion of the plurality of shaped members from the chamber, through the outlet of the perforating head, and into the tunnel in the subterranean formation; subsequent to releasing the portion of the plurality of shaped members into the tunnel, operating the laser tool to generate another laser beam to reflect off at least some of the laser reflective surfaces of the portion of the plurality of shaped members; and forming at least one sub-tunnel into the subterranean formation from the tunnel with the another laser beam reflected off at least some of the laser reflective surfaces of the portion of the plurality of shaped members.

In an aspect combinable with the example implementation, the plurality of shaped members includes a plurality of polyhedrons, each of the plurality of polyhedrons including the at least two laser reflective surfaces.

Another aspect combinable with any of the previous aspects further includes forming a plurality of sub-tunnels into the subterranean formation from the tunnel with the another laser beam reflected off the at least two laser reflective surfaces of the plurality of polyhedrons.

In another aspect combinable with any of the previous aspects, the plurality of polyhedrons includes a first portion of first polyhedrons having a first number of laser reflective surfaces and a second portion of second polyhedrons having a second number of laser reflective surfaces different than the first number.

In another aspect combinable with any of the previous aspects, each of the plurality of polyhedrons includes a number of reflective surfaces equal to a number of faces of the polyhedron.

In another aspect combinable with any of the previous aspects, each of the reflective surfaces includes a unique angle of incidence and a unique angle of reflection relative to the other reflective surfaces.

In another aspect combinable with any of the previous aspects, at least one of the plurality of polyhedrons includes a tetrahedron, a cube, an octahedron, a dodecahedron, or an icosahedron.

In another aspect combinable with any of the previous aspects, forming the at least one sub-tunnel into the subterranean formation from the tunnel with the another laser beam reflected off at least some of the laser reflective surfaces of the portion of the plurality of shaped members includes forming the at least one sub-tunnel into the subterranean formation from the tunnel with the another laser beam reflected off a mirrored or coated surface of at least some of the laser reflective surfaces of the portion of the plurality of shaped members.

Another aspect combinable with any of the previous aspects further includes generating the laser beam with a laser generator; and transmitting the generated laser beam from the laser generator to the laser tool through a fiber optic cable.

In another aspect combinable with any of the previous aspects, the tunnel is formed substantially orthogonal to a length of the wellbore, and the at least one sub-tunnel is angularly formed from the tunnel into the subterranean formation.

In another aspect combinable with any of the previous aspects, the tunnel is formed substantially orthogonal to a length of the wellbore.

In another aspect combinable with any of the previous aspects, the plurality of sub-tunnels are angularly formed from the tunnel into the subterranean formation, at least one of the plurality of sub-tunnels angularly formed from the tunnel at a first angle, and at least another of the plurality of sub-tunnels angularly formed from the tunnel at a second angle different than the first angle.

Another aspect combinable with any of the previous aspects further includes producing a fluid into the at least one sub-tunnel, and into the wellbore from the at least one sub-tunnel through the tunnel, from the subterranean formation.

In another aspect combinable with any of the previous aspects, the fluid includes a hydrocarbon fluid.

Implementations of systems and methods for forming perforation tunnels with a downhole laser tool according to the present disclosure may include one or more of the following features. For example, example implementations according to the present disclosure can create a network of perforation tunnels through application of a laser beam to improve fluid flow from a hydrocarbon bearing formation into a wellbore for production through the use of shaped members. As another example, example implementations according to the present disclosure can create multiple laser perforated tunnels from a single application of a laser beam into a subterranean formation with reflected laser beams to improve production from a wellbore. As another example, example implementations according to the present disclosure can create multi-directional laser perforated sub-tunnels from a single laser perforation tunnel in a subterranean formation.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 8 is a graph showing rate of penetration of a laser beam for different rock types according to the present disclosure.

DETAILED DESCRIPTION

Figure 1:
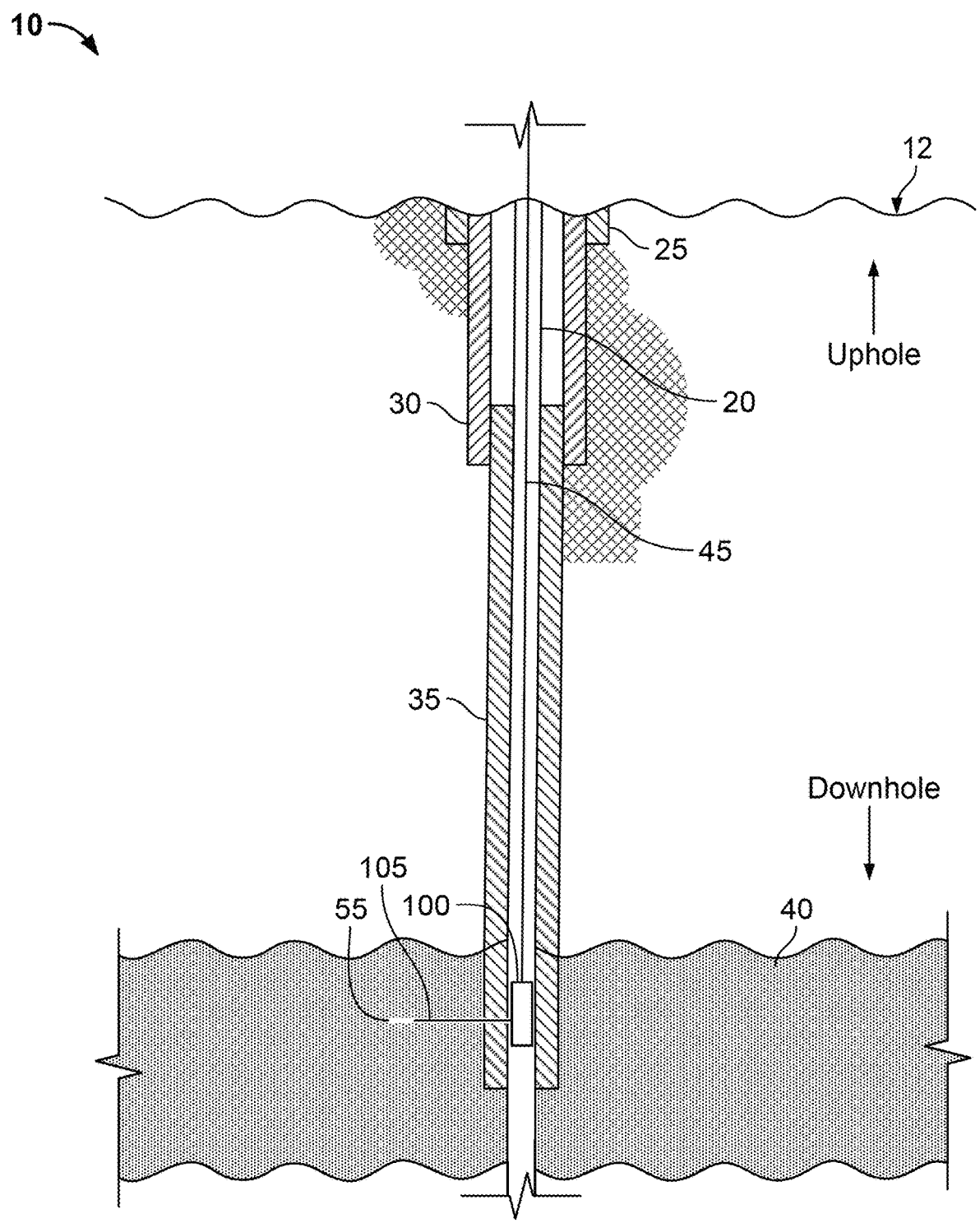
FIG. 1 is a schematic diagram of an example implementation of a wellbore system that includes a downhole tool for laser perforating a subterranean formation according to the present disclosure.

FIG. 1 is a schematic diagram of wellbore system 10 that includes a downhole tool 100 for laser perforating a subterranean formation (in other words, a rock formation) from a wellbore according to the present disclosure. Generally, FIG. 1 illustrates a portion of one embodiment of a wellbore system 10 according to the present disclosure in which the downhole tool 100 can be run into a wellbore 20 and activated to laser perforate a formation to form one or multiple tunnels 55 with a laser beam 105, as well as form one or more sub-tunnels from the tunnel 55 with laser beams reflected from one or more shaped members inserted into the tunnel 55 by the downhole tool 100 as described in more detail herein. In this example, the downhole tool 100 is connected to a downhole conveyance 45 during run in and run out operations in the wellbore 20. The downhole conveyance 45 can be, for example, a wireline or slickline, or other conductor. In alternative examples, the downhole conveyance 45 can be a tubing string (for example, drill string comprised of drill pipe sections, tubing work string or coiled tubing). In some aspects, the downhole conveyance 45 can include two or more conveyances, such as a conveyance for running in and running out operations, as well as a conveyance (such as a fiber optic cable) that supplies a generated laser beam to the downhole tool 100 (that is subsequently transmitted as the laser beam 105).

According to the present disclosure, the downhole tool 100 can be run into the wellbore 20 in order to laser perforate the tunnel(s) 55, as well as sub-tunnels, in the subterranean formation 40 for fluid production, such as hydrocarbon fluid production from the wellbore 20. Perforated tunnels and a size (for example, diameter and length) of the tunnel(s) 55 can be controlled by the beam size of laser beam 105. For example, relatively smaller beam size creates smaller tunnel(s) 55, while relatively larger beam size creates larger tunnel(s) 55. In some aspects, the laser beam 105 can create the tunnel(s) 55 regardless of rock type (or in most rock types in which hydrocarbon fluids can be recovered). Turning briefly to FIG. 8, this figure shows a graph 800 of rate of penetration of a laser beam relative to rock type. In graph 800, x-axis 802 represents rock type, with limestone, shale, different sandstones, and different granites shown. In graph 800, y-axis 804 represents rate of penetration of the laser beam in feet per hour (ft./hr.). As shown, laser beam technology can create tunnels in rock formations from about 70 ft./hr. to 120 ft./hr. depending on rock type.

Figure 9A:
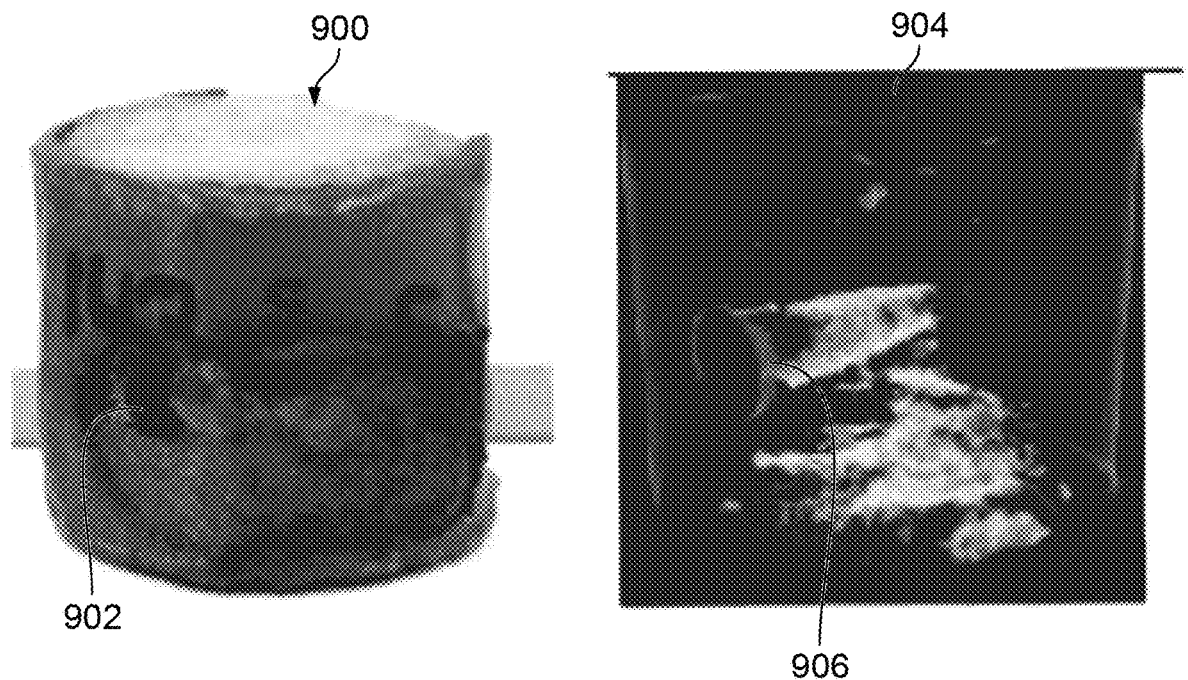
FIGS. 9A-9B show photographs and CT scans of a rock sample that has been laser perforated.
Figure 9B:
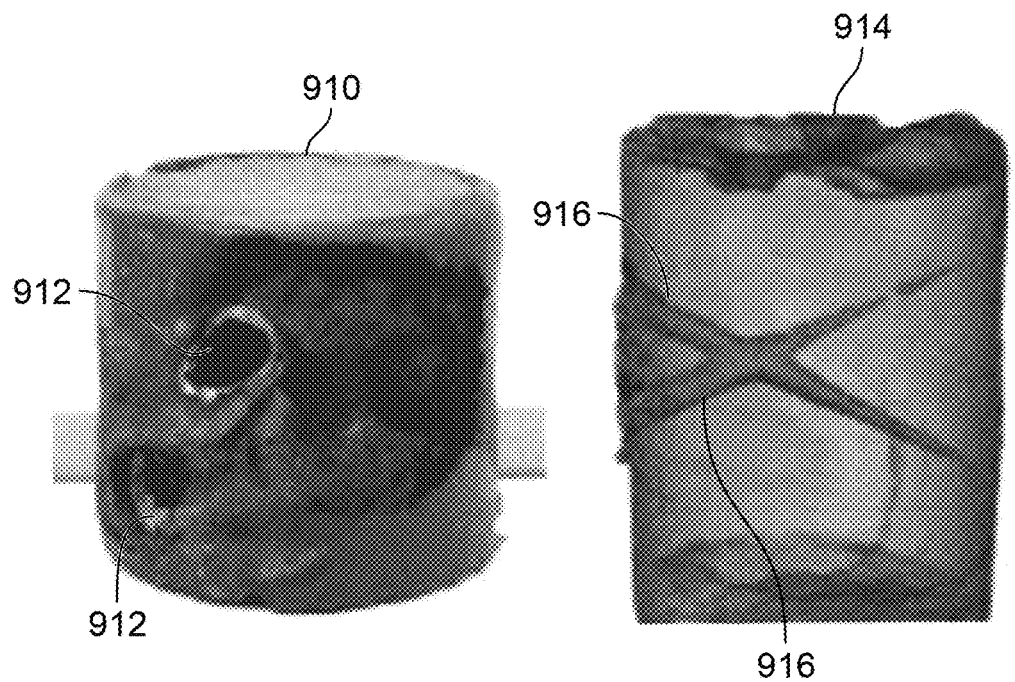
Figure 10A:
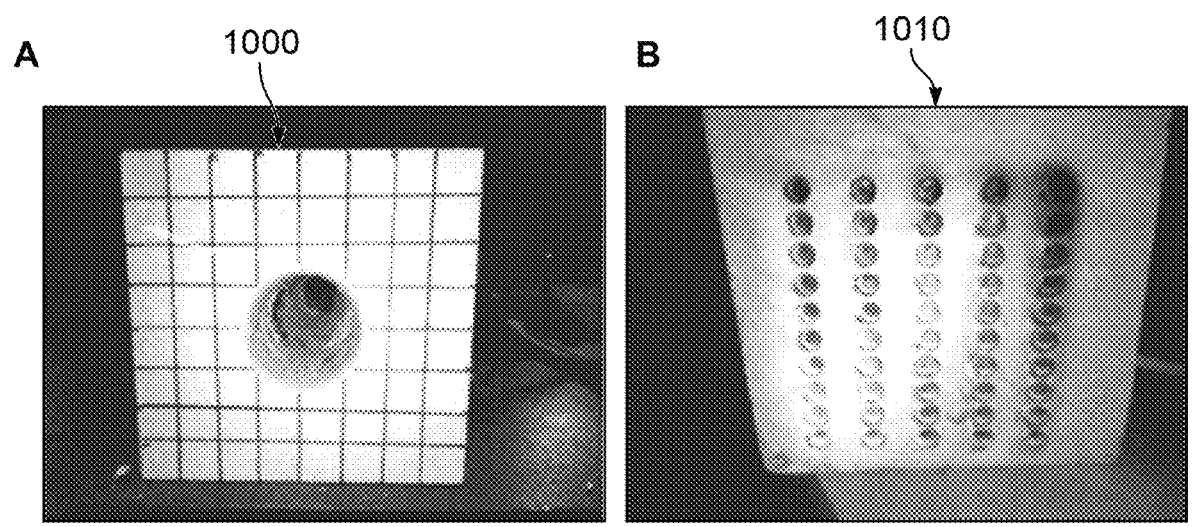
FIGS. 10A-10B show photographs and CT scans of rock samples that have been laser perforated.
Figure 10B:
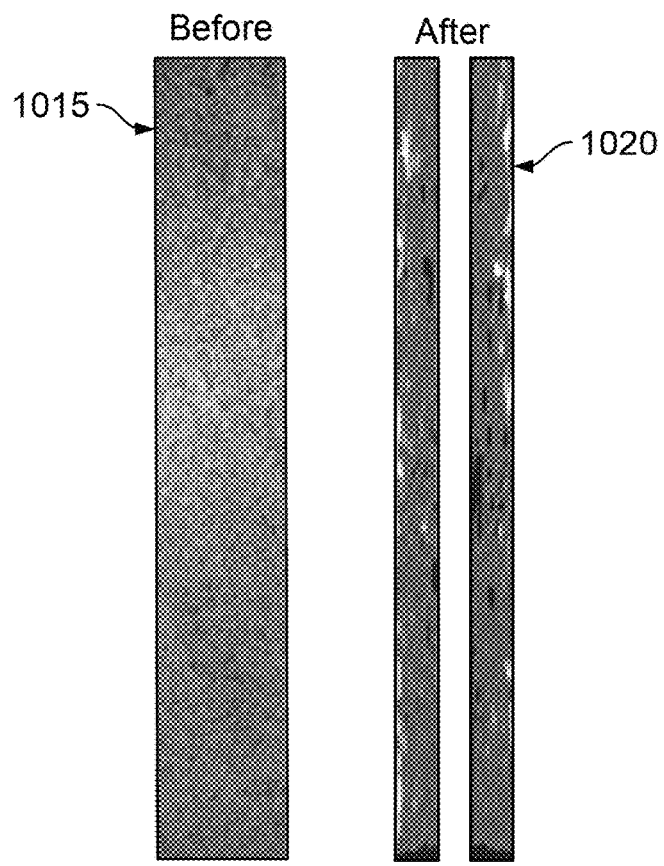

Further experiments with laser technology show that tunnels can be formed in different rock types. For example, turning to FIG. 9A, this figure shows an image 900 of a rock sample in which a laser perforation tunnel 902 has been formed. A CT scan 904 of the same rock sample shows the scanned tunnel 906 that penetrates the sample. Turning to FIG. 9B, this figure shows an image 910 of a rock sample in which two laser perforation tunnels 912 have been formed. A CT scan 914 of the same rock sample shows the scanned tunnels 912 that penetrate the sample. As further shown in FIG. 10A, this figure shows an image 1000 of a relatively large laser perforation tunnel formed in a sandstone block. FIG. 10A also shows, in contrast, an image 1010 of multiple, smaller laser perforation tunnels formed in a sandstone block with precision. Turning to FIG. 10B, this figure shows an image 1015 of a rock sample prior to laser perforating, while a CT image 1020 shows the rock sample after laser perforating. As shown in these examples, laser technology has sufficient precision to control of the laser to form tunnels of certain sizes and directions and orientations relative to a rock formation.

Turning back to FIG. 1, the wellbore system 10 accesses the subterranean formation 40 (and other formations) and provides access to hydrocarbons located in such subterranean formation 40. In an example implementation of system 10, the system 10 may be used for a production operation in which the hydrocarbons may be produced from the subterranean formation 40 within a wellbore tubular (for example, through the production casing 35 or other production tubular) subsequent to the laser perforating (and possibly other completion operations).

A drilling assembly (not shown) may be used to form the wellbore 20 extending from the terranean surface 12 and through one or more geological formations in the Earth. One or more subterranean formations, such as subterranean formation 40, are located under the terranean surface 12. One or more wellbore casings, such as a surface casing 30 and production casing 35, may be installed in at least a portion of the wellbore 20. In some embodiments, a drilling assembly used to form the wellbore 20 may be deployed on a body of water rather than the terranean surface 12. For instance, in some embodiments, the terranean surface 12 may be an ocean, gulf, sea, or any other body of water under which hydrocarbon-bearing formations may be found. In short, reference to the terranean surface 12 includes both land and water surfaces and contemplates forming and developing one or more wellbore systems 10 from either or both locations.

In some embodiments of the wellbore system 10, the wellbore 20 may be cased with one or more casings. As illustrated, the wellbore 20 includes a conductor casing 25, which extends from the terranean surface 12 shortly into the Earth. A portion of the wellbore 20 enclosed by the conductor casing 25 may be a large diameter borehole. Additionally, in some embodiments, the wellbore 20 may be offset from vertical (for example, a slant wellbore). Even further, in some embodiments, the wellbore 20 may be a stepped wellbore, such that a portion is drilled vertically downward and then curved to a substantially horizontal wellbore portion. Additional substantially vertical and horizontal wellbore portions may be added according to, for example, the type of terranean surface 12, the depth of one or more target subterranean formations, the depth of one or more productive subterranean formations, or other criteria.

Downhole of the conductor casing 25 may be the surface casing 30. The surface casing 30 may enclose a slightly smaller borehole and protect the wellbore 20 from intrusion of, for example, freshwater aquifers located near the terranean surface 12. The wellbore 20 may than extend vertically downward. This portion of the wellbore 20 may be enclosed by the production casing 35. Any of the illustrated casings, as well as other casings or tubulars that may be present in the wellbore system 10, may include wellbore liners.

Downhole tool 100 includes a laser tool used for creating fluid flow paths through hydrocarbon-bearing rock formations. The laser tool may operate downhole to create a fluid flow path (for example, tunnel 55 and sub-tunnels) through a wellbore casing (for example, casing 35) and the rock formation (for example, subterranean formation 40). The fluid flow path is created by controlling the laser tool to direct a laser beam to rock in the rock formation. In this example, the laser beam has an energy density that is great enough to cause at least some of the rock in the rock formation to sublimate. Sublimation includes changing from a solid phase directly into a gaseous phase without first changing into a liquid phase. In the case of rock, sublimation occurs when the temperature of the rock, which is increased by the laser beam, exceeds a threshold. That threshold is known as the sublimation point and may be different for different types of rock. In this example, the sublimation of the rock creates tunnels or cracks through the rock formation. Fluids may be introduced into those tunnels or cracks to fracture the rock formation and thereby promote the flow of production fluid, such as oil, from the rock formation into the wellbore.

The example downhole tool 100 can also include one or more sensors to monitor environmental conditions in the wellbore 20 and to output signals indicative of the environmental conditions. Examples of the sensors may include temperature sensors to measure temperature downhole, pressure sensors to measure pressure downhole, and acoustic sensors to measure noise levels downhole. Other sensors may also be used as described in this specification. Signals received from the sensors may indicate that there are problems inside the wellbore 20 or that there are problems with the laser tool of the downhole tool 100. A drilling engineer may take corrective action based on these signals. For example, if a temperature or pressure downhole is such that drilling equipment, such as the laser tool, may be damaged, that equipment may be withdrawn from the wellbore.

Figure 2:
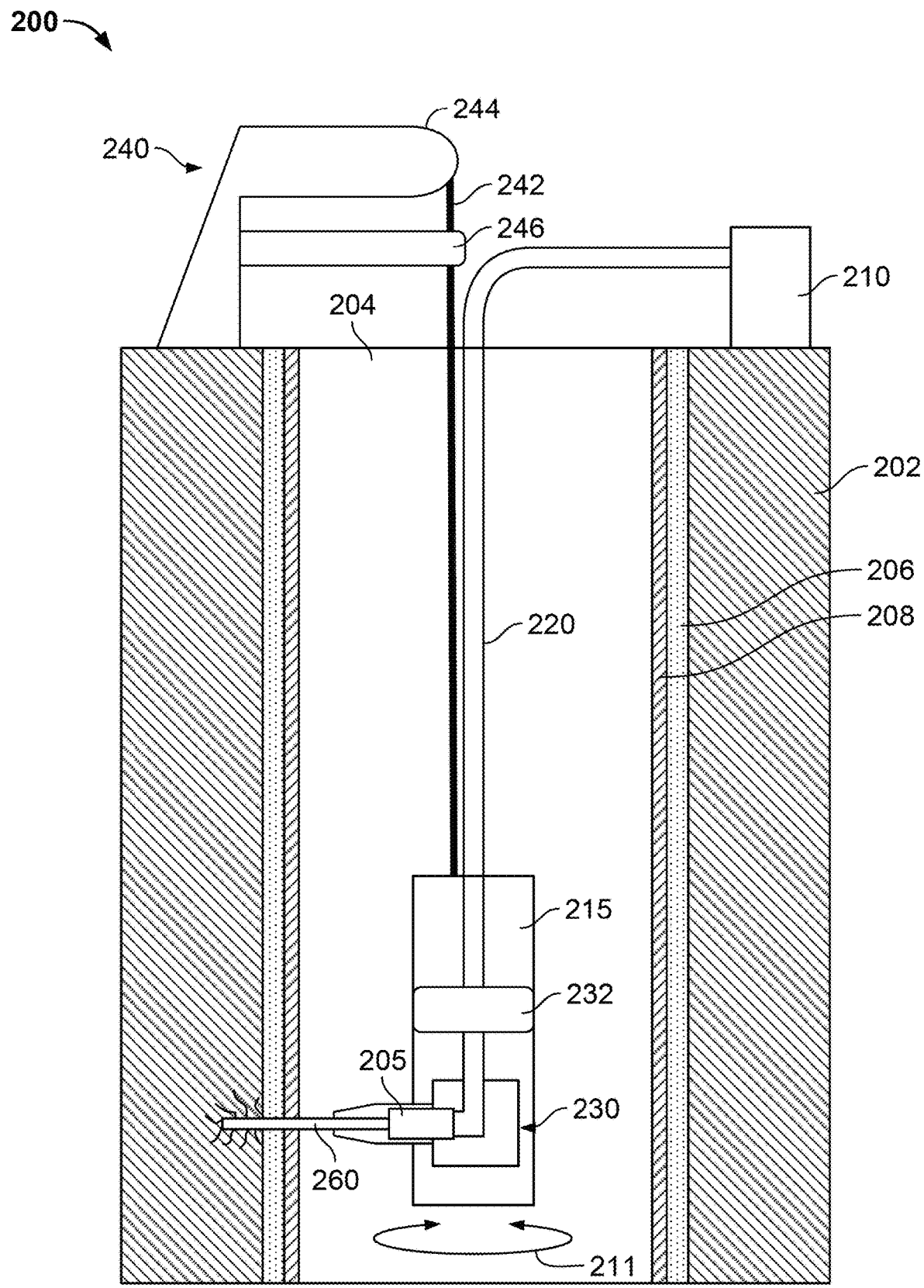
FIG. 2 is a schematic diagram of another example implementation of a wellbore system that includes a downhole tool for laser perforating a subterranean formation according to the present disclosure.

FIG. 2 shows components of a system 200 that includes an implementation of a laser tool 230 (in other words, a downhole tool that includes a laser tool) according to the present disclosure. At least part of system 200 is disposed within wellbore 204. Wellbore 204 passes through a hydrocarbon-bearing rock formation 202 ("rock formation 202"). Rock formation 202 may include various materials, such as limestone, shale, or sandstone. Each of these materials has a different sublimation point. The sublimation point may be affected by properties of the material, such as the density of the material and the porosity of the material. A casing 208 is cemented 206 in place to reinforce the wellbore against rock formation 202. A string 215 that houses the laser tool 230 is run downhole through casing 208.

Laser tool 230 is configured to output a laser beam 160. In this example, the laser tool is also configured to rotate about an axis in the wellbore 204, such as a central axis of the wellbore 204. In some implementations, the laser tool 230 is mounted on an axle (not shown) for rotation. A motor 232 can be included in string 215 to implement the rotation of laser tool 230 about the axle. In some implementations, the entire string 215 is connected to a drive arrangement 246 that is configured to rotate string 215 and thus laser tool 230. Rotation of the laser tool 230 is identified by circular arrow 211. During rotation, laser beam 160 may sweep the entire circumference of the wellbore. That is, the laser tool may rotate a full 360.degree. In some cases, the laser tool may rotate less than 360.degree.

Laser tool 230 is configured to direct laser beam 160 parallel to a surface containing the wellhead or at an angle that is not parallel to the surface. Laser tool 230 includes a chamber that holds one or more (and typically, many) shaped members that can be disposed in a laser perforated tunnel to subsequently create sub-tunnels into the rock formation 202 from the tunnel. Such sub-tunnels can be created, as described more fully herein, by the reflection of a generated laser beam 260 from reflective surfaces of the shaped members that are positioned in a previously-formed perforation tunnel.

System 200 includes a laser generating unit, such as laser generator 210. Laser generator 210 is configured to generate a laser beam and to output the laser beam to the laser tool 230. In some implementations, laser generator 210 is at the surface near to the wellhead. In some implementations, laser generator 210 is downhole, in whole or in part. The laser beam output by laser generator 210 is referred to as a raw laser beam because it has not been manipulated by laser tool 230. Examples of laser generator 210 include ytterbium lasers, erbium lasers, neodymium lasers, dysprosium lasers, praseodymium lasers, and thulium lasers. In an example implementation, laser generator 210 is a 5.34 kilowatt (kW) ytterbium-doped, multi-clad fiber laser.

In some implementations, laser generator 210 can be configured to output laser beams having different energy densities. Laser beams having different energy densities may be useful for rock formations that are composed of different materials having different sublimation points. For example, laser beams having different energy densities may be used to sublimate different types of rocks in a rock formation. In some implementations, the operation of laser generator 210 is programmable. For example, laser generator 210 may be programmed to vary the optical properties of the laser beam or the energy density of the laser beam.

In some implementations, the laser beam output by laser generator 10 has an energy density that is sufficient to heat at least some rock to its sublimation point. In this regard, the energy density of a laser beams a function of the average power output of the laser generator during laser beam output. In some implementations, the average power output of laser generator 210 is in one or more of the following ranges: between 500 Watts (W) and 1000 W, between 1000 W and 1500 W, between 1500 W and 2000 W, between 2000 W and 2500 W, between 2500 W and 3000 W, between 3000 Wand 3500 W, between 3500 W and 4000 W, between 4000 W and 4500 W, between 4500 W and 5000 W, between 5000 W and 5500 W, between 5500 W and 6000 W, between 6000 W and 6500 W, or between 6500 W and 7000 W.

Laser generator 210 can be part of an optical path that includes laser tool 230 and one or more optical transmission media. An example of an optical transmission medium that may be used is fiber optic cable 220. Fiber optic cable 220 may include a single fiber optic strand, multiple fiber optic strands, or multiple fiber optic cables that are run downhole from laser generator 210. Fiber optic cable 220 conducts the raw laser beam output by laser generator 210 to the laser tool 230. As described, the laser tool 230 can manipulate the laser beam to change the geometry of the laser beam, the direction of the laser beam, or both. The laser beam 160 output from the laser tool can penetrate downhole casings and cement to reach the rock formation. In the example of FIG. 2, this means that the laser beam 260 exits string 215 and penetrates casing 208 and cement 206 in order to reach the rock formation 202. The system may be configured to minimize, or to reduce, power loss along the optical path. In some implementations, each laser beam 160 has a power density or energy density (at the laser beam's target) that is 70% or more of the power density or energy density of the laser beam output by laser generator 210.

The duration in which the laser beam 260 is applied to the rock in the formation 202 may affect the extent to which the laser beam sublimates, and therefore penetrates, the rock. For example, the more time that the laser beam 260 is applied to a particular location, the greater the penetration of the rock at that location may be.

In some implementations, laser generator 210 is configured to operate in a run mode until a target penetration depth is reached. A run mode may include a cycling mode, a continuous mode, or both. During the continuous mode, laser generator 210 generates a laser beam continuously, for example, without interruption. In the continuous mode, laser generator 210 produces the laser beam until a target penetration depth is reached. During the cycling mode, laser generator 210 is cycled between being on and being off. In some implementations, laser generator 210 generates a laser beam during the on period. In some implementations, laser generator 210 does not generate a laser beam during the off period. In some implementations, laser generator 210 generates a laser beam during the off period, but the laser beam is interrupted before reaching laser tool 230 downhole. For example, the laser beam may be safely diverted or the laser beam may be blocked from output. Laser generator 210 may operate in the cycling mode to reduce the chances of one or more components of the system overheating, to clear a path of the laser beam, or both.

In the cycling mode, a duration of an on period can be the same as a duration of an off period. In the cycling mode, the duration of the on period can be greater than the duration of the off period, or the duration of the on period can be less than the duration of the off period. The duration of each on period and of each off period may be based on a target penetration depth. Other factors that may contribute to the duration of on periods and the duration of off periods include, for example, rock type, purging methods, laser beam diameter, and laser power.

The duration of each on period and of each off period may be determined by experimentation. Experiments on a sample of rock from a formation may be conducted prior to, or after, lowering the laser tool into the wellbore. Such experiments may be conducted to determine, for cycling mode, optimal or improved durations of each on period and of each off period. Alternatively or additionally, the duration of each on period and of each off period may be determined by geological methods. For example, seismic data or subsurface maps of rock formation 202 may be analyzed and the duration may be based on the result of the analysis or analyses.

In some implementations, on periods and off periods can last between one and five seconds. In an example operation, the on period lasts for 204 seconds and the off period lasts for 204 seconds. Such operation may enable the laser beam to penetrates a rock formation comprised of Berea sandstone to a depth of 230 centimeters (cm).

In this regard, the selection of a run mode may be based on a type of rock to penetrate and a target penetration depth. A rock formation that may require the laser generator to operate in the cycling mode includes, for example, sandstones having a large quartz content, such as Berea sandstone. A rock formation that may require the laser generator to operate in the continuous mode includes, for example, limestone.

Target penetration depth may be determined based on a variety of factors, such as a type of material or rock in the formation, a maximum horizontal stress of material or rock in the formation, a compressive strength of material or rock in the formation, a desired penetration depth, or a combination of two or more of these features. In some examples, penetration depth is measured from the interior wall of the wellbore. Examples of penetration depths may be on the order of millimeters, centimeters, or meters. Examples of penetration depths may include penetration depths between 200 millimeter (mm) and 210 mm, penetration depths between 200 centimeter (cm) and 100 cm, and penetration depths between 200 meter (m) and 200 m.

System 200, in this example implementation, includes a motion system 240. The motion system can include, for example, a hydraulic system, an electrical system, or motor operated system to move the laser tool to a target location. In this regard, the motion system is configured to move the laser tool 230 to different locations, such as depths, within the wellbore 204. To this end, the motion system includes at least one component, such as a downhole conveyance, that is movable within the wellbore. For example, the motion system may include cable 242 that is configured to move uphole or downhole to enable the laser tool 230 reach a target elevation. In an example, cable 242 may be at least partially spooled on a reel. A motor 244 may be connected to the reel. Motor 244 is configured to drive the reel to wind or to unwind cable 242. This causes cable 242 to move uphole or downhole within the wellbore.

Cable 242 is connected physically to string 215 such that movement of cable 242 translates to corresponding movement of string 215. As noted, string 215 can include laser tool 230. Thus, when string 215 moves, laser tool 30 also moves. Accordingly, the length of cable 242 within the wellbore maybe controlled to position the laser tool.

In some implementations, the motion system uses components other than cable 242 to move the laser tool. For example, the motion system may use a coiled tubing string to connect to string 215. The coiled tubing string may be moved uphole or downhole in the same manner as cable 242 is moved uphole or downhole.

In some implementations, the motion system can include a rotational drive system to implement rotation of string 215, and thus rotation of laser tool 230, about an axis in the wellbore. In an example implementation, the rotational drive system includes a motor and a drivetrain, such as an axle or rack and pinion arrangement (not shown), connected to cable 242 to implement the rotation of string 215.

A computing system may be configured—for example, programmed—to control positioning and operation of the laser tool 230. Examples of computing systems that may be used are described in this specification. Alternatively, or in addition, the laser generator may be configured to control positioning and operation of the laser tool 230. For example, the laser generator 210 may include circuitry or may include an on-board computing system to implement control over the positioning and operation of the laser tool. In either case, signals may be exchanged with the motion system and the laser tool via wired or wireless connections. In some implementations, signals may be exchanged with the motion system or laser tool via fiber optic media.

During operation, laser tool 230 may relay its angular position to a control system, such as the computing system or the laser generator. In response, the control system may to operate the tool to form tunnels or cracks in the rock formation. The control system, in these aspects, is intended to include various forms of digital computing hardware. Generally, the control system can include one or more processors, one or more memory components, and, in some aspects, an input/output device. Each of the components can be interconnected using a system bus. Certain features of the control system can be implemented in digital electronic circuitry in the controller, or in computer hardware, firmware, software, or in combinations of them. Features can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Materials used to implement the downhole components of system 200 maybe resistant to the temperatures, pressures, and vibrations that may be experienced within wellbore 204. The materials may protect the system from fluids, dust, and debris. In some implementations, the materials include one or more of iron, nickel, chrome, manganese, molybdenum, niobium, cobalt, copper, titanium, silicon, carbon, sulfur, phosphorus, boron, tungsten, steel, steel alloys, stainless steel, or tungsten carbide.

Figure 3:
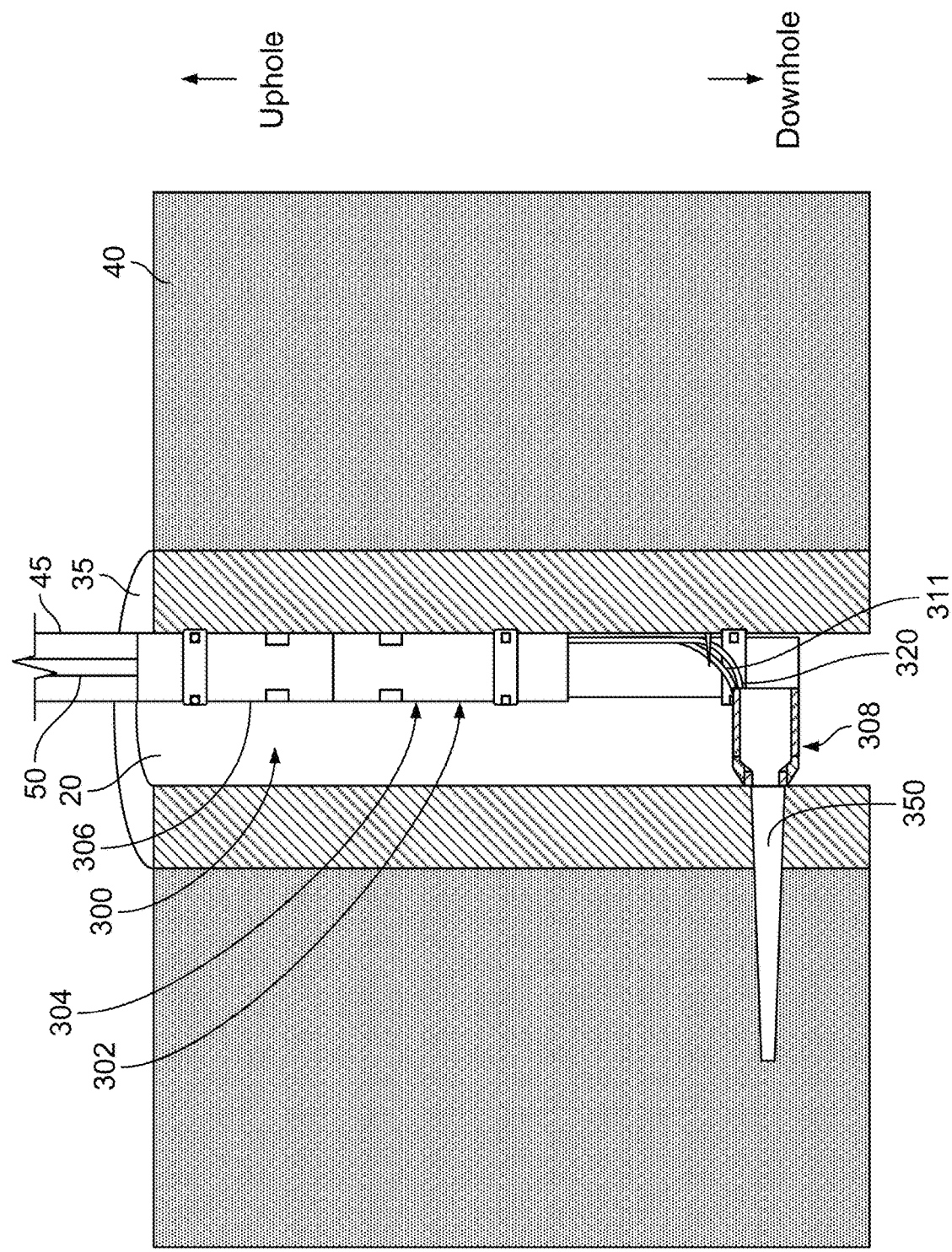
FIG. 3 is a schematic diagram of another example implementation of a downhole tool for laser perforating a subterranean formation according to the present disclosure.

FIG. 3 is a schematic diagram of another example implementation of a downhole tool 300 for laser perforating a subterranean formation according to the present disclosure. In some aspects downhole tool 300 can be used in either of wellbore systems 10 or 200 shown in FIG. 1 or 2, respectively, for laser perforating a wellbore to form tunnels and sub-tunnels (in other words, additional tunnels that extend from a laser perforated tunnel due to reflected laser energy) in a subterranean formation. In this example, the downhole tool 300 is shown coupled to the downhole conveyance 45 in the wellbore 20, which facilitates uphole and downhole movement of the downhole tool 300 in the wellbore 20 as well as, in some aspects (as described with reference to FIG. 2), rotation of the downhole tool 300 within the wellbore 20.

In this example implementation, the downhole tool 300 includes a housing 302 coupled to the conveyance 45 (for example, threadingly or otherwise). Coupled to or positioned within the housing 302 is a laser perforating tool 306 (or laser tool 306) and a chamber 304. A perforating head 308 is coupled to or within the housing 302 at a downhole end of the downhole tool 300.

Generally, the laser tool 306, in this example, is connected within an optical path to deliver a laser beam 350 from an outlet of the perforating head 308. In some aspects, the optical path includes a fiber optics cable 50 connected to, for instance, a laser generator positioned in a workstring that includes the downhole tool 300 or at a terranean surface (as explained with reference to FIG. 2). The fiber optic cable 50 can extend, in some aspects, to (or through) the laser tool 306 to carry a raw (for example, unshaped) laser beam 320 to the perforating head 308.

Figure 4:
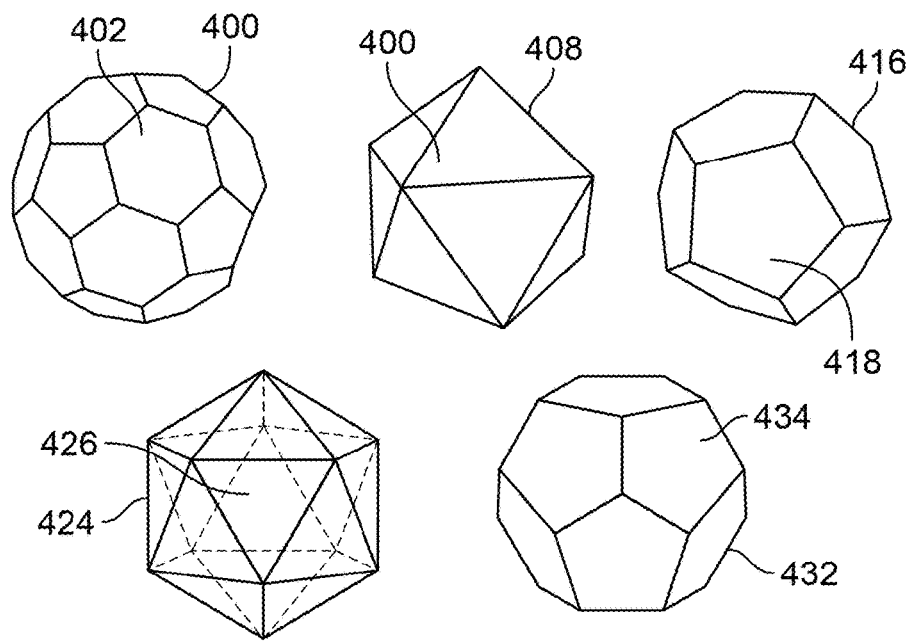
FIG. 4 includes schematic illustrations of example implementations of shaped members used in a downhole tool for laser perforating a subterranean formation according to the present disclosure.

The chamber 304 comprises a volume sized to enclose multiple shaped members, such as the example implementations of shaped members shown in FIG. 4. FIG. 4 shows examples of shaped members 400, 408, 416, 424, and 432. In these example, the shaped members are polyhedrons (for example, substantially spherical shaped members with multiple faces). Examples of polyhedrons can include tetrahedrons, decahedrons, cubes, octahedrons, dodecahedrons, and icosahedron, as well as many other examples. As shown in these example, each shaped member 400, 408, 416, 424, and 432 has multiple faces 402, 410, 418, 426, and 434, respectively. The number of the multiple faces 402, 410, 418, 426, and 434 depends on the type of polyhedron (for example, an octahedron has 8 faces, dodecahedron has 12 faces, etc.).

In the example implementations of the shaped members shown in FIG. 4, at least some of the faces (and in some aspects, all of the faces) of a shaped member can comprise a laser reflective surface (such as a mirrored surface or coated surface). Examples of materials or surfaces in which the faces (and in some aspects, the whole shaped member) can be made include quartz, sapphire, aluminum, bronze, or steel with mirror polish, among other examples of materials that can reflect light (or coated with a material that can reflect light). In some aspects, the examples of the shaped members 400, 408, 416, 424, and 432 are solid. In other examples, the shaped members 400, 408, 416, 424, and 432 are hollow.

Figure 6:
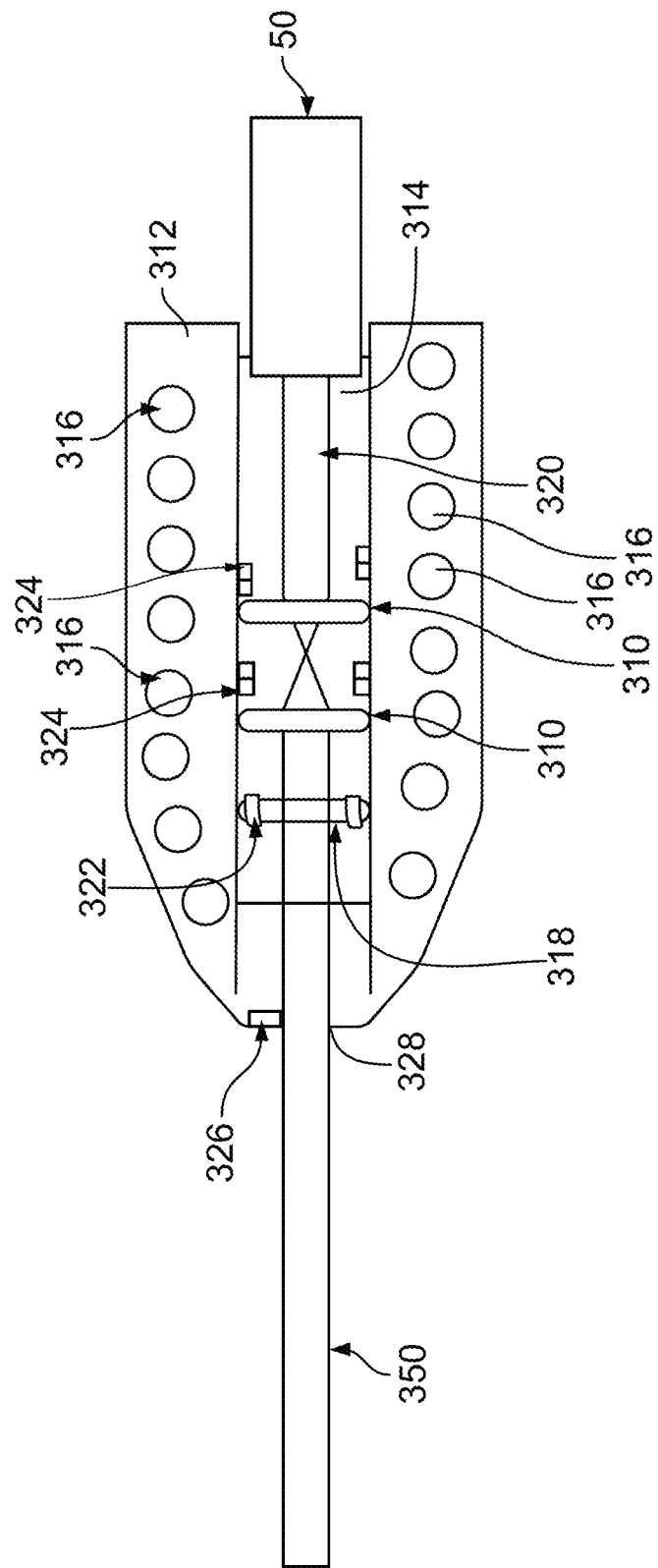
FIG. 6 is a schematic diagram of a perforating head of a downhole tool for laser perforating a subterranean formation according to the present disclosure.

Turning back to FIG. 3, the perforating head 308 is connected to the housing 302 at a downhole end, and functions to output a focused (for example, shaped) laser beam 350 toward the casing 35 (and subterranean formation 40). Turning to FIG. 6, this figure shows a more detailed view of the perforating head 308. As shown in FIG. 6, the fiber optic cable 50 delivers the raw laser beam 320 to an optical path 314 in the perforating head 308 toward one or more focus lenses 310. The focus lenses 310 can shape the raw laser beam 320 to a particular desired shape, for instance, depending on the type and focal point of these lenses 310. For example, the lenses 310 shape the raw laser beam 320 to create a desired beam shape and size, which will in turn dictate a size of a laser perforating tunnel formed by the focused laser beam 350.

In some aspects of the downhole tool 300, the lenses 310 can be a mono-optic element. An example of a mono-optic element is a unitary optical structure configured, for example, structured, arranged, or both—to manipulate laser beam. Manipulation includes altering one or more properties of the laser beam. Examples of mono-optic elements include a crystal and a lens. Other examples of mono-optic elements are provided in this specification. The mono-optic element can be configured to receive, via the optical path 314, the raw laser beam 320 output from a laser generator. The optical path may include one or more optical transmission media, such as fiber optic cables, that are strung downhole. The received laser beam is "raw" in the sense that the laser beam has not been acted-upon by the mono-optic element. The mono-optic element manipulates the raw laser beam by altering a geometry of the raw laser beam, a direction of the raw laser beam, or both the geometry and the direction of the raw laser beam. The laser beam output by the mono-optic element is directed to the rock formation as laser beam 350; as described previously, the laser beam heats rock to cause tunnels or cracks to form in the rock formation.

The shaped laser beam 350 then travels through a cover lens 318 and to an outlet 328 of the perforating head 308. The cover lens 318 can prevent unwanted reflection of the focused laser beam 350 back into the perforating head 308, as well as protect the focus lens 310 (or lenses 310).

As shown in this example, one or more conduits 312 (two in this example) extend through the perforating head 308 separate from the optical path 314 and can hold multiple shaped members 316 (such as one or more of the shaped members 400, 408, 416, 424, or 432, or a combination thereof). The shaped members 316 can be released from the chamber 304 to travel or fall to the conduits 312 or, alternatively, the conduits 312 can extend to the chamber 304 and be filled with shaped members 316 during operation of the downhole tool 300. For example, the chamber 304 can be pressurized (for example, with a fluid from the surface or otherwise) to urge the shaped members 316 from the chamber 304 and into the conduits 312 (and out of the conduits 312 into a laser perforated tunnel).

As further shown in FIG. 6, the one or more conduits 312 are also coupled to the outlet 328 of the perforating head 308, thereby allowing one or more of the shaped members 316 to exit the perforating head 308 through the outlet 328 (for example, while the focused laser beam 350 is not being output through the outlet 328.

As further shown in FIG. 6, the perforating head 308 can include one or more lens purges 324 (for example, at least one per lens 310). In some aspects, the lens purge 324 is located on a side of a lens 310 (or one on either side) and can provide a purging gas to clear and cool the lens 310 (for example, during or after operation of the laser tool to provide the raw laser beam 320), as the lens 310 will heat up from the laser energy.

The perforating head 308 can also a tool purge 322. The tool purge 322 can function to clear the path of the focused laser beam 350 and to prevent any debris from entering the perforating head 308 through the outlet 328 and damaging the lenses 310.

As shown in FIG. 6, one or more sensors 326 can be mounted or positioned in the perforating head 308, such as at or near the outlet 328. The one or more sensors 326, as described with reference to FIG. 2, can function to monitor environmental conditions in the wellbore and to output signals indicative of the environmental conditions. Examples of the sensors may include temperature sensors to measure temperature downhole, pressure sensors to measure pressure downhole, and acoustic sensors to measure noise levels downhole. Signals received from the sensors may indicate that there are problems inside the wellbore or that there are problems with the laser tool 306 of the downhole tool 300.

Figure 7:
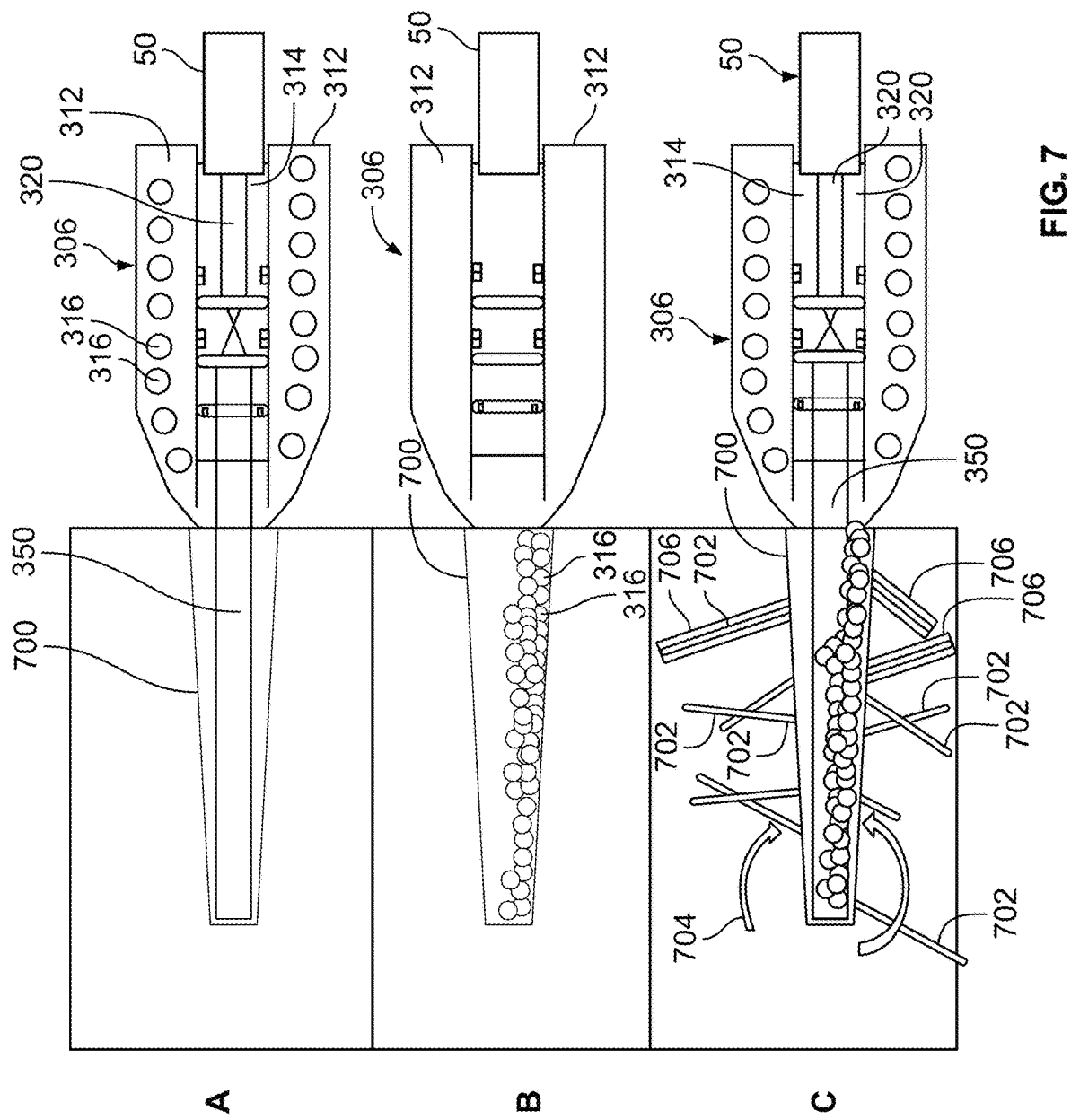
FIG. 7 includes schematic illustrations of a laser perforation operation with a downhole tool for laser perforating a subterranean formation according to the present disclosure.

FIG. 7 includes schematic illustrations of a laser perforation operation with the downhole tool 300, and specifically, an example operational sequence of the perforating head 308 of the downhole tool 300. In an example operation, the downhole tool 300 can be run into a wellbore to a particular depth or location (for example, on the downhole conveyance 45 and coupled with the fiber optic cable 50). Once at the desired location in the wellbore, the laser tool 306 can be operated to deliver the raw laser beam 320 from the laser generator to the perforating head 308 through the optical path 314 (as shown in (A) of FIG. 7). The raw laser beam 320 is shaped and focused through the one or more lenses 310, and output through the outlet 328 of the perforating head 308 toward the subterranean formation (and casing or other tubular if present), as also shown in FIG. 7 at (A). The focused laser beam 350 forms a tunnel 700 in the subterranean formation as shown in (A) of FIG. 7.

Subsequent to the formation of tunnel 700, the laser tool 306 is deactivated, stopping the raw laser beam 320 from being delivered to the perforating head 308, as shown in FIG. 7 at (B). Next, one or more (and likely, many) of the shaped members 216 are released from the perforating head 308 to move through the conduit(s) 312, through the outlet 328, and into the tunnel 700. In some aspects, a fluid (for example, gas) or other substance (for example, a gel) can be circulated through the conduits 312 to urge the shaped members 316 through the outlet 328 and into the tunnel 700. This is shown in (B) of FIG. 7 as well. The size and/or number of the shaped members 316 can be designed, in some aspects, on the size (for example, diameter and/or length) of the tunnel 700.

Figure 5:
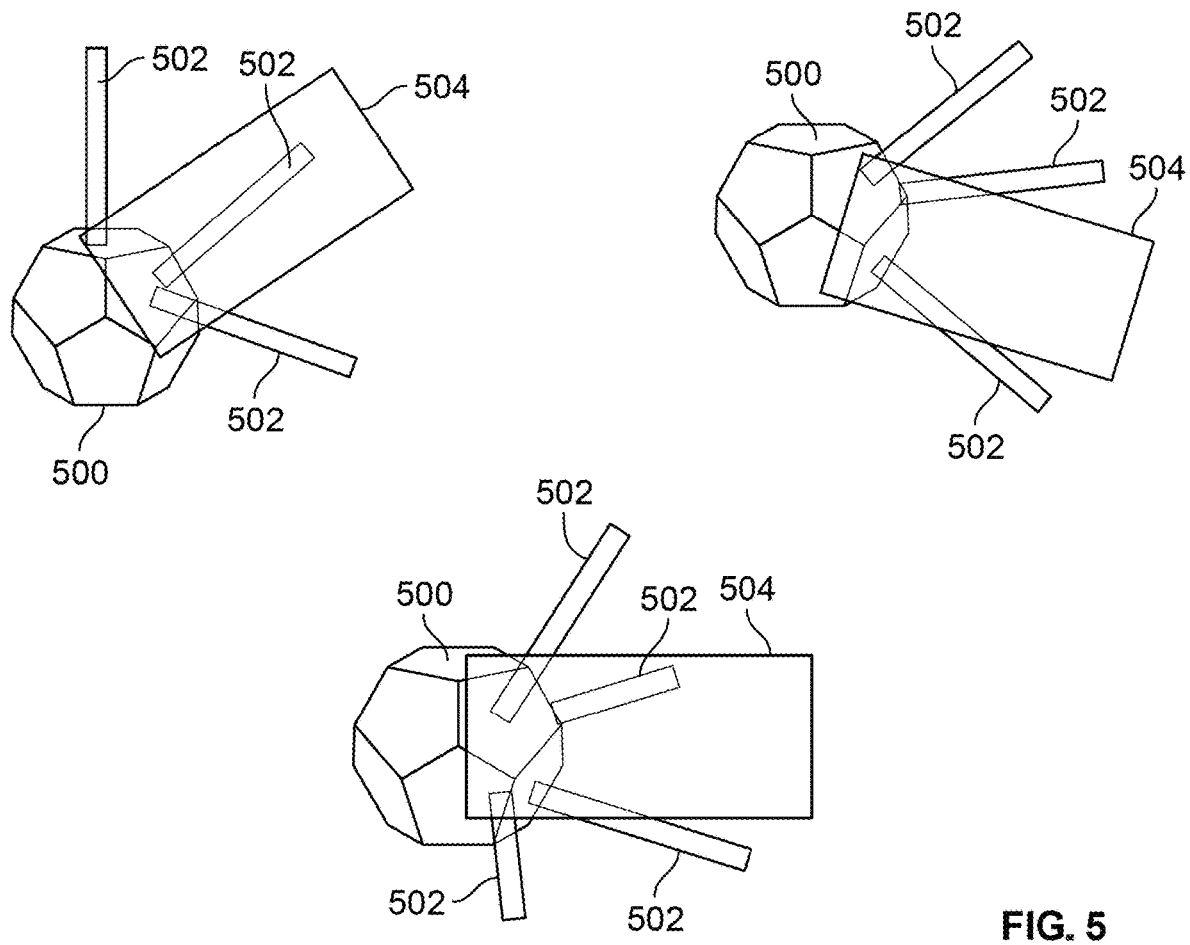
FIG. 5 includes schematic illustrations of an example implementation of a shaped member receiving and reflecting a laser beam from a downhole tool for laser perforating a subterranean formation according to the present disclosure.

Once the shaped members 316 have been positioned in the tunnel 700 (as shown in (B) of this figure), the laser tool 306 can be activated again to deliver the raw laser beam 320 to the perforating head 308 through the optical path 314 as shown in (C) of FIG. 7. The focused laser beam 350 can then output through the outlet 328 as shown to contact and reflect off the shaped members 316. Turning briefly to FIG. 5, this figure illustrates a shaped member receiving and reflecting a laser beam from a downhole tool such as downhole tool 300. As shown, FIG. 5 includes different views (A)-(C) of a shaped member 500 with multiple laser reflecting faces receiving a focused laser beam 504 and reflecting the focused laser beam 504 into reflected laser beams 502. As shown, each focused laser beam 504 contacts the shaped member at a particular angle of incidence, while each reflected laser beam 502 reflects off the shaped member 500 at a particular angle of reflection (for example, depending on which reflective face receives the focused laser beam 504 and depending on the angle of incidence). Thus, for a single shaped member 500, a single focused laser beam 504 can generate multiple reflected laser beams 502.

Turning back to the view (C) of FIG. 7, the focused laser beam 350 contacts the shaped members 316 within the tunnel 700, and reflected laser beams 702 are generated to then create sub-tunnels 706 in the subterranean formation. The number of sub-tunnels 706 and the orientation of each sub-tunnel 706 relative to the tunnel 700 from which it extends can depend on, for example, the angle of incidence of the focused laser beam 350 on the particular shaped member 316 and the angles of reflection of the reflected laser beams 702 from the particular shaped member 316.

As further shown in FIG. 7 in (C), the tunnel 700 and sub-tunnels 706 can form fluid pathways from the subterranean formation into the wellbore for a fluid 704. The fluid 704 can be a hydrocarbon fluid or other fluid. In some aspects, the fluid 704 can be produced to a terranean surface. In some aspects, flow of the fluid 704 can also circulate the shaped members 316 from the tunnel 700 and into the wellbore (for retrieval to the surface or not).

Once the sub-tunnels 706 have been created, the laser tool 306 can be deactivated. The example operational steps described with reference to FIG. 7 can be repeated, either at a different depth in the wellbore or at a different radial location within the wellbore but at the same depths. For example, the downhole tool 300 can be rotated on the conveyance 45 (as previously described), and additional tunnels 700 and sub-tunnels 706 can be formed at one or more other radial locations at a particular depth in the wellbore. Further, the downhole tool 300 can be moved (uphole or downhole), and additional tunnels 700 and sub-tunnels 706 can be formed at multiple depths in the wellbore.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A downhole tool, comprising:
   a housing configured to couple to a downhole conveyance that is extendable from a terranean surface, through a wellbore, and to a subterranean formation;
   a laser tool positioned in the housing and configured to transmit a laser beam sufficient to form a tunnel in the subterranean formation;
   a chamber positioned in the housing and configured to enclose a plurality of shaped members, each of the plurality of shaped members comprising at least two laser reflective surfaces; and
   a perforating head coupled to the housing, the perforating head comprising:
      an optical pathway formed to receive the laser beam from the laser tool and output the laser beam toward the subterranean formation through an outlet of the perforating head; and
      at least one conduit separate from the optical pathway and configured to receive at least a portion of the plurality of shaped members from the chamber and output the portion of the plurality of shaped members through the outlet of the perforating head.

2. The downhole tool of claim 1, wherein the plurality of shaped members comprises a plurality of polyhedrons, each of the plurality of polyhedrons comprising the at least two laser reflective surfaces.

3. The downhole tool of claim 2, wherein the plurality of polyhedrons comprises a first portion of first polyhedrons having a first number of laser reflective surfaces and a second portion of second polyhedrons having a second number of laser reflective surfaces different than the first number.

4. The downhole tool of claim 2, wherein each of the plurality of polyhedrons comprises a number of reflective surfaces equal to a number of faces of the polyhedron.

5. The downhole tool of claim 4, wherein each of the reflective surfaces comprises a unique angle of incidence and a unique angle of reflection relative to the other reflective surfaces.

6. The downhole tool of claim 2, wherein at least one of the plurality of polyhedrons comprises a tetrahedron, a cube, a decahedron, an octahedron, a dodecahedron, or an icosahedron.

7. The downhole tool of claim 1, wherein each of the at least two laser reflective surfaces comprises a mirrored or coated surface.

8. The downhole tool of claim 1, wherein the laser tool is configured to couple to a laser generator through a fiber optic cable, the laser generator configured to generate the laser beam and transmit the generated laser beam to the laser tool through the fiber optic cable.

9. The downhole tool of claim 1, wherein the perforating head further comprises:
at least one focus lens positioned in the optical pathway and configured to shape the laser beam toward the outlet; and
a cover lens positioned between the at least one focus lens and the outlet and configured to protect the at least one focus lens.

10. The downhole tool of claim 1, wherein at least one of the plurality of shaped members is hollow.

11. A method for laser perforating a subterranean formation, the method comprising:
running a downhole tool on a downhole conveyance into a wellbore formed from a terranean surface into a subterranean formation, the downhole tool comprising:
a housing coupled to downhole conveyance,
a laser tool positioned in the housing,
a chamber positioned in the housing that encloses a plurality of shaped members, each of the plurality of shaped members comprising at least two laser reflective surfaces, and
a perforating head coupled to the housing;
operating the laser tool to transmit a laser beam through an optical pathway formed in the perforating head and through an outlet of the perforating head to form a tunnel in the subterranean formation;
subsequent to forming the tunnel in the subterranean formation with the laser beam, releasing at least a portion of the plurality of shaped members from the chamber, through the outlet of the perforating head, and into the tunnel in the subterranean formation;
subsequent to releasing the portion of the plurality of shaped members into the tunnel, operating the laser tool to generate another laser beam to reflect off at least some of the laser reflective surfaces of the portion of the plurality of shaped members; and
forming at least one sub-tunnel into the subterranean formation from the tunnel with the another laser beam reflected off at least some of the laser reflective surfaces of the portion of the plurality of shaped members.

12. The method of claim 11, wherein the plurality of shaped members comprises a plurality of polyhedrons, each of the plurality of polyhedrons comprising the at least two laser reflective surfaces, the method further comprising:
forming a plurality of sub-tunnels into the subterranean formation from the tunnel with the another laser beam reflected off the at least two laser reflective surfaces of the plurality of polyhedrons.

13. The method of claim 12, wherein the plurality of polyhedrons comprises a first portion of first polyhedrons having a first number of laser reflective surfaces and a second portion of second polyhedrons having a second number of laser reflective surfaces different than the first number.

14. The method of claim 12, wherein each of the plurality of polyhedrons comprises a number of reflective surfaces equal to a number of faces of the polyhedron.

15. The method of claim 14, wherein each of the reflective surfaces comprises a unique angle of incidence and a unique angle of reflection relative to the other reflective surfaces.

16. The method of claim 12, wherein at least one of the plurality of polyhedrons comprises a tetrahedron, a cube, an octahedron, a dodecahedron, or an icosahedron.

17. The method of claim 12, wherein the tunnel is formed substantially orthogonal to a length of the wellbore, and
the plurality of sub-tunnels are angularly formed from the tunnel into the subterranean formation, at least one of the plurality of sub-tunnels angularly formed from the tunnel at a first angle, and at least another of the plurality of sub-tunnels angularly formed from the tunnel at a second angle different than the first angle.

18. The method of claim 11, wherein forming the at least one sub-tunnel into the subterranean formation from the tunnel with the another laser beam reflected off at least some of the laser reflective surfaces of the portion of the plurality of shaped members comprises forming the at least one sub-tunnel into the subterranean formation from the tunnel with the another laser beam reflected off a mirrored or coated surface of at least some of the laser reflective surfaces of the portion of the plurality of shaped members.

19. The method of claim 11, further comprising:
generating the laser beam with a laser generator; and
transmitting the generated laser beam from the laser generator to the laser tool through a fiber optic cable.

20. The method of claim 11, wherein the tunnel is formed substantially orthogonal to a length of the wellbore, and the at least one sub-tunnel is angularly formed from the tunnel into the subterranean formation.

21. The method of claim 11, further comprising producing a fluid into the at least one sub-tunnel, and into the wellbore from the at least one sub-tunnel through the tunnel, from the subterranean formation.

22. The method of claim 21, wherein the fluid comprises a hydrocarbon fluid.

* * * * *